United States Patent
Park et al.

(10) Patent No.: US 10,361,978 B2
(45) Date of Patent: *Jul. 23, 2019

(54) METHOD AND APPARATUS FOR MANAGING DATA USING PLURAL PROCESSORS

(71) Applicant: Samsung Electronics Co., Ltd., Gyeonggi-do (KR)

(72) Inventors: Su-Young Park, Gyeonggi-do (KR); Su-Ha Yoon, Seoul (KR); Eui-Chang Jung, Seoul (KR); Jae-Woong Chun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,647

(22) Filed: Sep. 17, 2018

(65) Prior Publication Data

US 2019/0020610 A1  Jan. 17, 2019

Related U.S. Application Data

(63) Continuation of application No. 15/008,825, filed on Jan. 28, 2016, now Pat. No. 10,079,788.

(30) Foreign Application Priority Data

Jan. 28, 2015  (KR) .................. 10-2015-0013397

(51) Int. Cl.
*H04L 12/58* (2006.01)
*H04M 1/725* (2006.01)
(Continued)

(52) U.S. Cl.
CPC .......... *H04L 51/046* (2013.01); *G06F 1/3209* (2013.01); *G06F 1/3287* (2013.01);
(Continued)

(58) Field of Classification Search
CPC ... H04L 51/046; G06F 1/3209; G06F 1/3287; G06F 1/3293; H04W 52/02; H04W 52/0209; H04M 1/7253
See application file for complete search history.

(56) References Cited

U.S. PATENT DOCUMENTS 10,079,788 B2 *  9/2018  Park ............... H04L 51/046
2009/0059899 A1   3/2009  Bendelac
(Continued)

FOREIGN PATENT DOCUMENTS

| JP | 2013-77928 A | 4/2013 |
|---|---|---|
| KR | 10-2012-0096866 A | 8/2012 |
| WO | 2008/031635 A1 | 3/2008 |

*Primary Examiner* — Nguyen T Vo
(74) *Attorney, Agent, or Firm* — Cha & Reiter LLC.

(57) ABSTRACT

A method for managing data in an electronic device including a first processor and a second processor, the method comprising: receiving data transmitted by a first external device by using the first processor; identifying, by the first processor, a service or content corresponding to the data; in response to detecting that the data corresponds to a first service or a first content, using the first processor to transmit at least a portion of the data to the second processor; and in response to detecting that the data corresponds to a second service or a second content, using the first processor to transmit at least a portion of the data to a second external device.

20 Claims, 11 Drawing Sheets

(51) Int. Cl.
   *G06F 1/3209*   (2019.01)
   *G06F 1/3287*   (2019.01)
   *G06F 1/3293*   (2019.01)

(52) U.S. Cl.
   CPC ......... *G06F 1/3293* (2013.01); *H04M 1/7253* (2013.01); *Y02D 10/122* (2018.01); *Y02D 10/171* (2018.01); *Y02D 50/20* (2018.01)

(56) References Cited

U.S. PATENT DOCUMENTS

| | | |
|---|---|---|
| 2011/0019600 A1 | 1/2011 | Ping et al. |
| 2012/0159218 A1 | 6/2012 | Vangala et al. |
| 2012/0213136 A1 | 8/2012 | Woo et al. |
| 2013/0084844 A1 | 4/2013 | Saito |
| 2014/0094198 A1 | 4/2014 | Heo et al. |
| 2014/0351560 A1 | 11/2014 | Lautner et al. |
| 2014/0358535 A1 | 12/2014 | Lee et al. |
| 2016/0127924 A1 | 5/2016 | Lee et al. |
| 2016/0132369 A1 | 5/2016 | Lee et al. |

\* cited by examiner

METHOD AND APPARATUS FOR MANAGING DATA USING PLURAL PROCESSORS

CROSS REFERENCE TO RELATED APPLICATIONS

This application is a Continuation of U.S. patent application Ser. No. 15/008,825 filed on Jan. 28, 2016 which claims the benefit under 35 U.S.C. § 119(a) of a Korean patent application filed in the Korean Intellectual Property Office on Jan. 28, 2015 and assigned Serial No. 10-2015-0013397, the entire disclosure of which is incorporated herein by reference.

TECHNICAL FIELD

The present disclosure relates to electronic devices, in general, and more particularly, to a method and apparatus for managing data using a plurality of processors.

BACKGROUND

An electronic device may provide a user with a communication function or a data input/output function executed with an external device by processing a large amount of data in various manners using, for example, a plurality of processors. The processors may include a first processor (for example, a communication processor (CP)) for transmitting and receiving data to and from an external device, for example, by wireless or wired communication, and a second processor (for example, an application processor (AP)) for processing the data in a form suitable for an input or output device operatively connected to the electronic device.

Conventionally, if an electronic device having a plurality of processors including a first processor (for example, a CP) and a second processor (for example, an AP) receives data from an external device using the first processor (for example, a CP), it unconditionally transmits the received data to the second processor (for example, an AP) without determining whether the second processor (for example, an AP) is in a sleep state, in order to process the received data suitably for an output device. For example, even though the received data is of low importance or includes user-unintended data, the electronic device switches the second processor (for example, an AP) from the sleep state to an active state and processes the received data using the second processor (for example, an AP), to immediately provide the received data to a user.

In some cases, when the electronic device acquires (for example, receives) data transmitted by an external device, the (acquired) data may be provided to the user through another external device, not through the electronic device. Even in this case, the conventional electronic device switches the second processor (for example, an AP) from the sleep state to the active state using the first processor (for example, a CP) that has received the data transmitted by the external device, and then transmits the data to another external device using the (active) second processor. For example, the electronic device transmits data in the order of the first processor, the second processor, and the external device.

Since the conventional electronic device switches the second processor to the active state unconditionally in response to data reception with no regard to the property of the data or the state of the second processor, the use of the second processor unnecessarily increases current consumption. Moreover, if the received data has a relatively low priority level, the user may want to check the data sometime after reception of the data according to the state of the electronic device (for example, a residual battery capacity, a used memory capacity, or the temperature of the electronic device). Nonetheless, each time the electronic device receives data, the electronic device switches the second processor from the sleep state to the active state and thus immediately provides the received data to the user. As a consequence, user-unintended data may often be provided to the user, thus causing user inconvenience.

The above information is provided as background information only to assist with an understanding of the present disclosure. No determination has been made, and no assertion is made, as to whether any of the above might be applicable as prior art with regard to the present disclosure.

SUMMARY

According to aspects of the disclosure, a method is provided for managing data in an electronic device including a first processor and a second processor, the method comprising: receiving, by the first processor, a message transmitted by a first external device; identifying, by the first processor, a service or an application corresponding to the message based on information of the massage; and determining, by the first processor, whether activating the second processor to process the message or providing at least a portion of the message to a second external device which is operatively coupled with the electronic device, according to the identified service or application corresponding to the message.

According to aspects of the disclosure, an electronic device is provided comprising: a memory; a first processor operatively coupled to the memory; a second processor operatively coupled to the memory, wherein the first processor is configured to: receive a message transmitted by a first external device, identify a service or an application corresponding to the message based on information of the massage, determining, by the first processor, whether activating the second processor to process the message or providing at least a portion of the message to a second external device which is operatively coupled with the electronic device, according to the identified service or application corresponding to the message.

According to aspects of the disclosure, a non-transitory computer-readable medium is provided that stores one or more processor executable instructions, which when executed by a first processor of an electronic device cause the first processor to perform a method comprising the steps of: receiving, by the first processor, a message transmitted by a first external device; identifying, by the first processor, a service or an application corresponding to the message based on information of the massage; and determining, by the first processor, whether activating the second processor to process the message or providing at least a portion of the message to a second external device which is operatively coupled with the electronic device, according to the identified service or application corresponding to the message.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
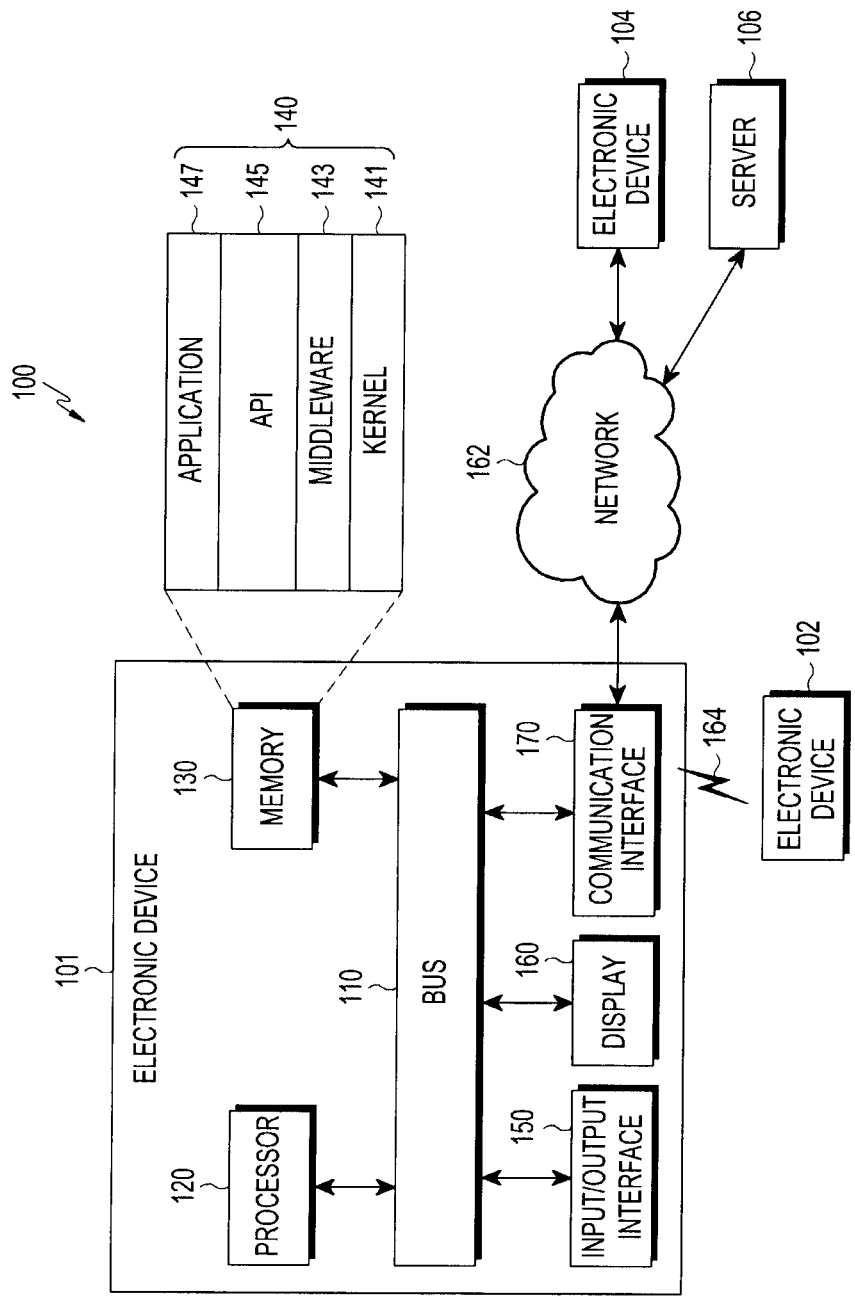
FIG. 1 is a block diagram of an example of a network environment, according to various embodiments.

Various embodiments of the present disclosure are described with reference to the accompanying drawings. However, the scope of the present disclosure is not intended to be limited to the particular embodiments, and it is to be understood that the present disclosure covers all modifications, equivalents, and/or alternatives falling within the scope and spirit of the present disclosure. In relation to a description of the drawings, like reference numerals denote the same components.

In the present disclosure, the term 'have', 'may have', 'include', or 'may include' signifies the presence of a specific feature (for example, number, function, operation, or component like a part), not excluding the presence of addition of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions may be used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used in the present disclosure may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the corresponding operations.

The terms as used in the present disclosure are provided to describe merely specific embodiments, not intended to limit the scope of other embodiments. It is to be understood that singular forms include plural referents unless the context clearly dictates otherwise. The terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

According to various embodiments of the present disclosure, an electronic device may be at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG-1 audio layer-3 (MP3) player, a mobile medical equipment, a camera, and a wearable device. According to various embodiments, the wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), a body-attached type (for example, a skin pad or a tattoo), and an implantable type (for example, an implantable circuit).

According to some embodiments, an electronic device may be a home appliance. For example, the home appliance may be at least one of, for example, a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, or the like), a game console (for example, Xbox™, PlayStation™, or the like), an electronic dictionary, an electronic key, a camcorder, and an electronic picture frame.

According to other embodiments, an electronic device may be at least one of a medical device (for example, a portable medical meter such as a blood glucose meter, a heart rate meter, a blood pressure meter, a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler), and the like.

According to some embodiments, an electronic device may be at least one of furniture, part of a building/structure, an electronic board, an electronic signature receiving device, a projector, and various measuring devices (for example, water, electricity, gas or electro-magnetic wave measuring devices). According to various embodiments, an electronic device may be one or a combination of two or more of the foregoing devices. According to some embodiments, an electronic device may be a flexible electronic device. In addition, it will be apparent to one having ordinary skill in the art that an electronic device according to an embodiment of the present disclosure is not limited to the foregoing devices and covers a new electronic device produced along with technology development.

With reference to the attached drawings, an electronic device according to various embodiments will be described below. In the present disclosure, the term 'user' may refer to a person or device (for example, artificial intelligence electronic device) that uses an electronic device.

Referring to FIG. 1, an electronic device 101 in a network environment 100 according to various embodiments is described. The electronic device 101 may include a bus 110, a processor 120, a memory 130, an input/output (I/O) interface 150, a display 160, and a communication interface 170. In some embodiments, at least one of the components may be omitted in the electronic device 101 or a component may be added to the electronic device 101.

The bus 110 may include a circuit that interconnects, for example, the foregoing components 110 to 170 and allows communication (for example, control messages and/or data) between the foregoing components 110 to 170.

The processor 120 may include one or more of a CPU, an AP, and a communication processor (CP). The processor 120 may, for example, execute computation or data processing related to control and/or communication of at least one other component of the electronic device 101.

The memory 130 may include a volatile memory and/or non-volatile memory. The memory 130 may, for example, store instructions or data related to at least one other component. According to an embodiment, the memory 130 may store software and/or programs 140. The programs 140 may include, for example, a kernel 141, middleware 143, an application programming interface (API) 145, and/or application programs (or applications) 147. At least a part of the kernel 141, the middleware 143, and the API 145 may be called an operating system (OS).

The kernel 141 may control or manage system resources (for example, the bus 110, the processor 120, or the memory 130) that are used in executing operations or functions implemented in other programs such as the middleware 143, the API 145, or the application programs 147. Also, the kernel 141 may provide an interface for allowing the middleware 143, the API 145, or the application programs 147 to access and control or manage individual components of the electronic device 101.

The middleware 143 may serve as a medium through which the kernel 141 may communicate with, for example, the API 145 or the application programs 147 to transmit and receive data. Also, the middleware 143 may process one or more task requests received from the application programs 147 according to their priority levels. For example, the middleware 143 may assign priority levels for using system resources (the bus 110, the processor 120, or the memory 130) of the electronic device 101 to at least one of the application programs 147. For example, the middleware 143 may perform scheduling or load balancing for the one or more task requests according to the priority levels assigned to the at least one application program 147.

The API 145 is an interface that may control functions that the application programs 147 provide at the kernel 141 or the middleware 143. For example, the API 145 may include at least one interface or function (for example, a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) to the user or the external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various types of content (for example, text, an image, a video, an icon, or a symbol) to the user. The display 160 may include a touch screen and receive, for example, a touch input, a gesture input, a proximity input, or a hovering input through an electronic pen or a user's body part.

The communication interface 170 may establish communication, for example, between the electronic device 101 and an external device (for example, a first external electronic device 102, a second external electronic device 104, or a server 106). For example, the communication interface 170 may be connected to a network 162 by wireless or wired communication and communicate with the external device (for example, the second external electronic device 104 or the server 106) over the network 162.

The wireless communication may be conducted using, for example, at least one of long-term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol. The wireless communication may include, for example, short-range communication 164. The short-range communication 164 may be conducted by, for example, at least one of wireless fidelity (WiFi), Bluetooth, near field communication (NFC), and GNSS. GNSS may include, for example, at least one of global positioning system (GPS), global navigation satellite system (GLONASS), Beidou navigation satellite system (hereinafter, referred to as 'Beidou'), and Galileo, the European global satellite-based navigation system, according to a region using the GNSS or a bandwidth. In the present disclosure, the terms 'GPS' and 'GNSS' are interchangeably used with each other. The wired communication may be conducted in conformance with, for example, at least one of universal serial bus (USB), high definition multimedia interface (HDMI), recommended standard 2302 (RS-2302), and plain old telephone service (POTS). The network 162 may be a telecommunication network, for example, at least one of a computer network (for example, local area network (LAN) or wide area network (WAN)), the Internet, and a telephone network.

Each of the first and second external electronic devices 102 and 104 may be of the same type as or a different type from the electronic device 101. According to an embodiment, the server 106 may include a group of one or more servers. According to various embodiments, all or a part of operations performed in the electronic device 101 may be performed in one or more other electronic devices (for example, the electronic devices 102 and 104) or the server 106. According to an embodiment, if the electronic device 101 is to perform a function or a service automatically or upon request, the electronic device 101 may request at least a part of functions related to the function or the service to another device (for example, the electronic device 102 or 104 or the server 106), instead of performing the function or the service autonomously, or additionally. The other electronic device (for example, the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
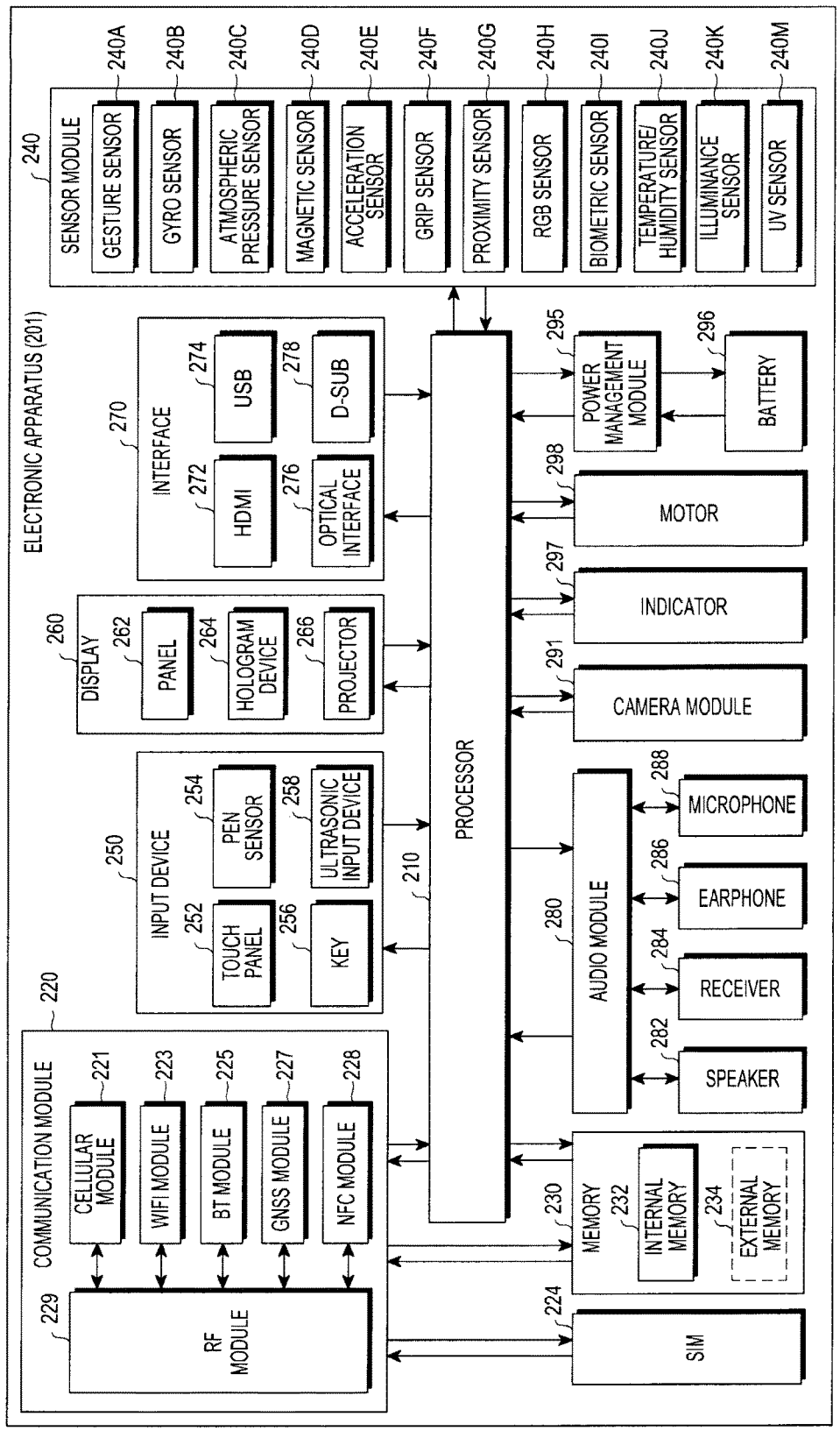
FIG. 2 is a block diagram of an example of an electronic device, according to various embodiments.

FIG. 2 is a block diagram of an electronic device 201 according to various embodiments. The electronic device 201 may include, for example, the whole or part of the electronic device 101 illustrated in FIG. 1. The electronic device 201 may include at least one processor (for example, AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may, for example, control a plurality of hardware or software components that are connected to the processor 210 by executing an OS or an application program and may perform processing or computation of various types of data. The processor 210 may be implemented, for example, as a system on chip (SoC). According to an embodiment, the processor 210 may further include a graphics processing unit (GPU) and/or an image signal processor. According to an embodiment, the processor 210 may include at least a part (for example, a cellular module 221) of the components illustrated in FIG. 2. The processor 210 may load a command or data received from at least one of other components (for example, a non-volatile memory), process the loaded command or data, and store various types of data in the non-volatile memory.

The communication module 220 may have the same configuration as or a similar configuration to the communication interface 170 illustrated in FIG. 1. The communication module 220 may include, for example, the cellular module 221, a WiFi module 223, a Bluetooth (BT) module 225, a GNSS module 227 (for example, a GPS module, a Glonass module, a Beidou module, or a Galileo module), an NFC module 228, and a radio frequency (RF) module 229.

The cellular module 221 may provide services such as voice call, video call, short message service (SMS), or the Internet, for example, through a communication network. According to an embodiment, the cellular module 221 may identify and authenticate the electronic device 201 within a communication network, using the SIM (for example, a SIM card) 224. According to an embodiment, the cellular module 221 may perform at least a part of the functionalities of the processor 210. According to an embodiment, the cellular module 221 may include a CP. While the cellular module 221 has been described as included in the CP, for the convenience of description, the CP may include the cellular module 221 (the CP may be included in the cellular module 221) according to various embodiments. This may be changed depending on a circuit design or logic structure made by a designer or manufacturer of the electronic device.

Each of the WiFi module 223, the BT module 225, the GNSS module 227, and the NFC module 228 may include, for example, a processor that may process data received or transmitted by the respective modules. According to an embodiment, at least a part (for example, two or more) of the cellular module 221, the WiFi module 223, the BT module 225, the GNSS module 227, and the NFC module 228 may be included in a single integrated chip (IC) or IC package.

The RF module 229 may transmit and receive, for example, communication signals (for example, RF signals). The RF module 229 may include, for example, a transceiver, a power amplifier module (PAM), a frequency filter, a low noise amplifier (LNA), an antenna, or the like. According to another embodiment, at least one of the cellular module 221, the WiFi module 223, the BT module 225, the GNSS module 227, and the NFC module 228 may transmit and receive RF signals via a separate RF module.

The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may be at least one of, for example, a volatile memory (for example, dynamic RAM (DRAM), static RAM (SRAM), or synchronous dynamic RAM (SDRAM)), and a non-volatile memory (for example, one-time programmable ROM (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state drive (SSD)).

The external memory 234 may further include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, and an ultraviolet (UV) sensor 240M. Additionally or alternatively, the sensor module 240 may include, for example, an electrical-nose (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252, a (digital) pen sensor 254, a key 256, or an ultrasonic input device 258. The touch panel 252 may operate in at least one of, for example, capacitive, resistive, infrared, and ultrasonic schemes. The touch panel 252 may further include a control circuit. The touch panel 252 may further include a tactile layer to thereby provide haptic feedback to the user.

The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (for example, a microphone 288), and identify data corresponding to the sensed ultrasonic signals.

The display 260 (for example, the display 160) may include a panel 262, a hologram device 264, or a projector 266. The panel 262 may have the same configuration as or a similar configuration to the display 160 illustrated in FIG. 1. The panel 262 may be configured to be, for example, flexible, transparent, or wearable. The panel 262 and the touch panel 252 may be implemented as a single module. The hologram device 264 may utilize the interference of light waves to provide a three-dimensional image in empty space. The projector 266 may provide an image by projecting light onto a screen. The screen may be positioned, for example, inside or outside the electronic device 201. According to an embodiment, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD/multimedia card (MMC) interface, or an infrared data association (IrDA) interface.

The audio module 280 may convert, for example, a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment, the camera module 291 may include one or more image sensors (for example, a front sensor or a rear sensor), a lens, an image signal processor (ISP), or a flash (for example, an LED or a xenon lamp).

The power management module 295 may manage the power supply of the electronic device 201. According to an embodiment, the power management module 295 may include a power management integrated circuit (PMIC), a charger IC, or a battery fuel gauge. The PMIC may adopt wired and/or wireless charging. The wireless charging may be performed, for example, in a magnetic resonance scheme, a magnetic induction scheme, or an electromagnetic wave scheme, and may use additional circuits for wireless charging, such as a coil loop, a resonance circuit, or a rectifier. The battery fuel gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (for example, the processor 210), for example, boot status, message status, or charge status. The motor 298 may convert an electrical signal into a mechanical vibration and generate vibrations or a haptic effect. While not shown, the electronic device 201 may include a processing device for supporting mobile TV (for example, a GPU). The processing device for supporting mobile TV may process media data compliant with, for example, digital multimedia broadcasting (DMB), digital video broadcasting (DVB), or MediaFLO.

Each of the above-described components of the electronic device may include one or more parts and the name of the component may vary with the type of the electronic device. According to various embodiments, the electronic device may be configured to include at least one of the aforedescribed components. Some component may be omitted from or added to the electronic device. According to various embodiments, one entity may be configured by combining a part of the components of the electronic device, to thereby perform the same functions of the components prior to the combining.

Figure 3:
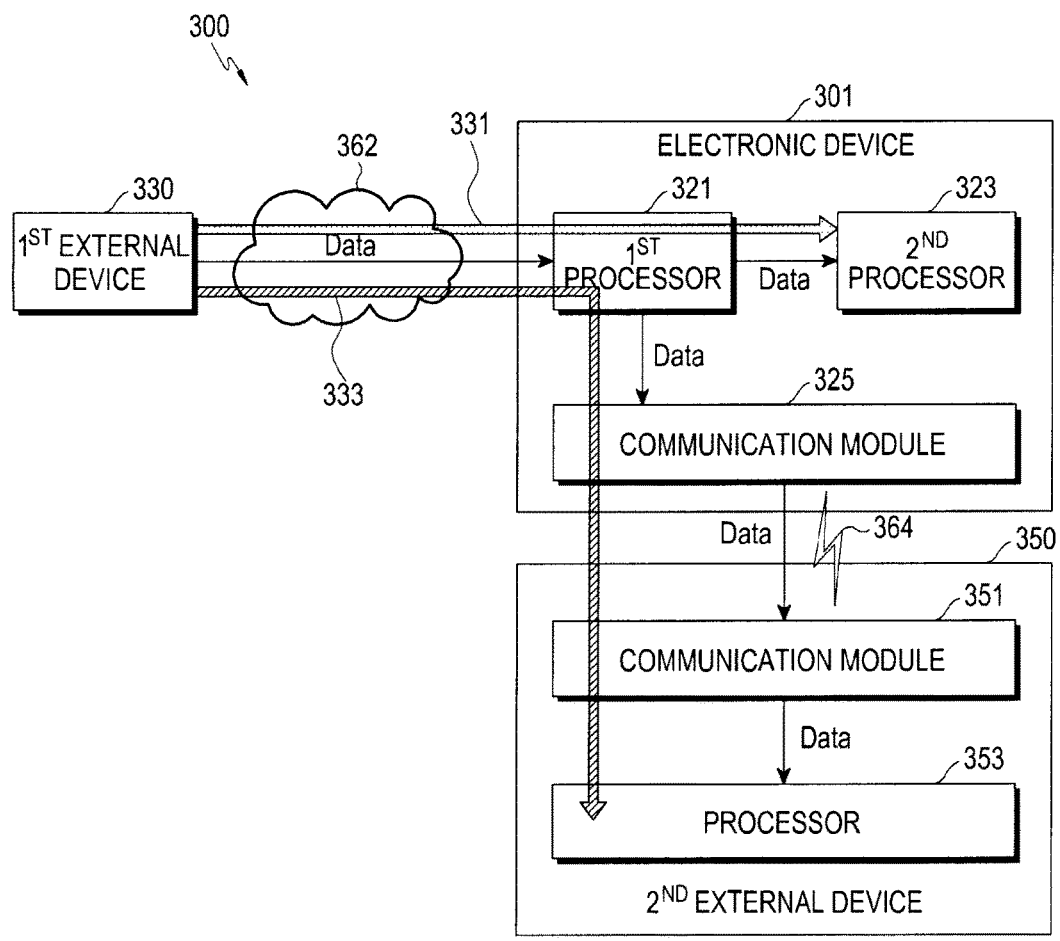
FIG. 3 is a diagram illustrating an example of a plurality of data flows, according to various embodiments.

FIG. 3 is a diagram illustrating an example of a plurality of data flows, according to various embodiments. A description will not be given for the same part as or a similar part to that illustrated in FIGS. 1 and 2.

Referring to FIG. 3, data may be exchanged between an electronic device 301 (for example, the electronic device 101), a first external device 330 (for example, the electronic device 104), and a second external device 350 (for example, the electronic device 102), for example, over a network 362 (for example, the network 162) or through short-range communication 365 (for example, the short-range communication 164) in a network environment 300. For example, the data transmitted from the first external device 330 to the electronic device 301 (for example, the electronic device 101) may follow a first transmission path 331 when the data is not forwarded further by the electronic device 301. When the data is forwarded to a second external device 350, the data may follow a second transmission path 333.

According to an embodiment, the electronic device 301 may include a first processor 321 (for example, a CP), a second processor 323 (for example, the processor 210), and a communication module 325 (for example, the WiFi module 223, the BT module 225, or the NFC module 228). For example, even though the second processor 323 for processing data related to an application is in a sleep state, the first processor 321 may process the data received from the first external device 330 through the network 362 and transmit the processed data to the second processor 323, or the second external device 350 by the short-range communication 364. The first external device 330 may be any of, for example, an app server that manages (for example, stores, updates, or provides) one or more applications, or various electronic devices that may share one or more applications with other devices, like a smartphone, a laptop computer, a tablet PC, a wearable electronic device, or electronic furniture.

According to an embodiment, the first processor 321 may select a different transmission path for the received data based on at least a part of the received data. For example, the first processor 321 may select at least one of the first transmission path 331 and the second transmission path 333 based on the type of an application that is identified based on the data. For example, the first processor 321 may select only the first transmission path 331, only the second transmission path 333, or both the first and second transmission paths 331 and 333, based on an application type.

For example, if the data is data related to a first application (for example, data displayable through the first application), the first processor 321 may transmit at least a part of the data to the second processor 323 via the first transmission path 331. According to an embodiment, when the data is transmitted over the first transmission path 331, the second processor 323 may transition from the sleep state to the active state and provide (for example, output) at least a part of the data to a user.

On the other hand, if the data is data related to a second application (for example, data displayable through the second application), the first processor 321 may transmit at least a part of the data to the second external device 350, for example, in the second transmission path 333. In this case, the first processor 321 may transmit the data to the second external device 350 via the second transmission path 333. According to an embodiment, the first processor 321 may transmit, for example, at least a part of the data to the communication module 325 so that at least a part of the data may be transmitted to the second external device 350 by the short-range communication 364. In this case, the second processor 323 may be maintained, for example, in the sleep state.

The sleep state may include, for example, a state in which the second processor 323 does not process any data. The sleep state may also include, for example, a state in which a clock signal allowing the second processor 323 to receive an interrupt signal from the first processor 321 is provided to the second processor 323. The interrupt signal may be, for example, a signal indicating the absence of data to be processed by the second processor 323, a signal that releases the second processor 323 from the sleep state, an active request signal for the second processor 323, or a signal including data (for example, at least a part of the data) transmitted by the first or second external device 330 or 350.

The active state may refer to, for example, a state in which the second processor 323 is processing specific data. For example, the active state may include a state in which an image (for example, a home image) is output on a display operatively connected to the second processor 323, a state in which an execution screen of an application is output on the display, or a state in which at least a part of the data is provided to a user through various output devices. According to an embodiment, the active state may include, for example, a state in which although no data is output through an output device, the second processor 323 processes specific data in the background.

According to an embodiment, if the first transmission path 331 is determined to be the transmission path of the data, the second processor 323 may switch, for example, from the sleep state to the active state and provide at least a part of the data to the user. For example, the second processor 323 may output the at least part of the data for presentation to the user in image, sound, vibration, or scent through. The data may be output by using a display (for example, the display 260), an audio module (for example, the audio module 280), a motor (for example, the motor 298), or a scent emitter, which is operatively connected to the second processor 323.

The second external device 350 may include, for example, a communication module 351 and a processor 353 (for example, an AP). The communication module 351 may transmit at least a part of the data received from the electronic device 301 to the processor 353, for example, in the second transmission path 333. The processor 353 may output at least part of the data for presentation to a user via a display, an audio module, a motor, or a scent emitter, which is operatively connected to the processor 353. According to an embodiment, the second external device 350 may be a wearable and/or implantable electronic device.

While it has been described above that the first processor 321 receives the data from the first external device 330 through the network 362 by way of example, in some implementations the first processor 321 may receive data from the first external device 330 via the short-range communication 364 instead. Further, the first processor 321 may transmit the data received from the first external device 330 to the second external device 350 through the network 362 and/or by using the short-range communication 364, according to various embodiments.

Figure 4:
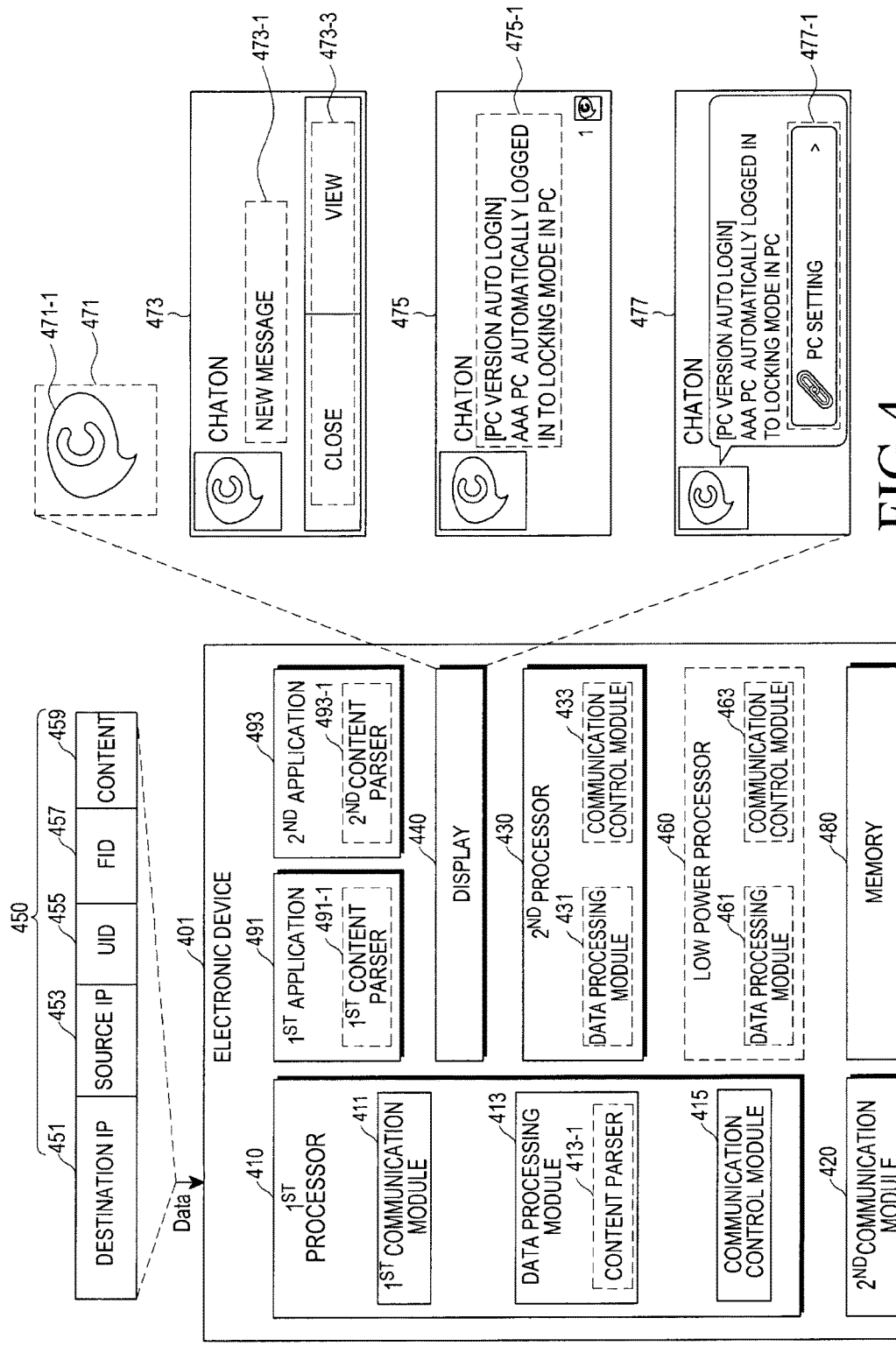
FIG. 4 is a block diagram of an example of an electronic device, according to various embodiments.

FIG. 4 is a block diagram of an example of an electronic device (for example, the electronic device 101) according to various embodiments. The same components as or similar components to those illustrated in FIGS. 1, 2, and 3 will not be described herein. Referring to FIG. 4, an electronic device 401 may include, for example, a first processor 410 (for example, the first processor 321), a second processor 430 (for example, the second processor 323), a display 440 (for example, the display 160), and a memory 480 (for example, the memory 130 or 230).

The first processor 410 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The second processor 430 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The memory 480 may include any suitable type of volatile or non-volatile memory, such as Random-access Memory (RAM), Read-Only Memory (ROM), Network Accessible Storage (NAS), cloud storage, a Solid State Drive (SSD), etc.

According to aspects of the disclosure, the first processor 410 may include, for example, a first communication module 411, a data processing module 413, and a communication control module 415. According to an embodiment, the first processor 410 may receive data 450 transmitted by one or more external devices (for example, the first external device 330) (hereinafter, referred to as 'first external devices'), for example, through the first communication module 411. The data 450 may be received, for example, while the second processor 430 is in the sleep state. According to an embodiment, the data 450 may be processed in a different path according to content included in the data 450 or a service (for example, an application) that uses the data 450. Related additional information will be described below in relation to, for example, the data processing module 413.

According to an embodiment, the data 450 may include at least one of a destination internet protocol (IP) 451, a source IP 453, a user identification (UID) 455, a function identification (FID) 457, and content 459. The destination IP 451 may include an address of a receiving device (for example, the electronic device 401) that will receive the data 450. The source IP 453 may include an address of an electronic device transmitting the data 450 (for example, the first external device 330).

According to an embodiment, the UID 455 may include a unique alphanumerical string and/or number that identifies an application corresponding to the data. For example, if the data 450 is generated by or used for a first application (for example, a first instant messenger), the UID 455 may include first identification information (for example, 001), and if the data 450 is related to a second application (for example, a second instant messenger or a telephone application), the UID 455 may include second identification information (for example, 002).

The FID 457 may include a unique alphanumerical string and/or a number associated with a specific function of the application corresponding to the data 450 (for example, the application identified by the UID 455). For example, if the data 450 is generated by or used in conjunction with a first function of the application, the FID 457 may include first identification information (for example, 0001), and if the data 450 is generated by or used in conjunction with a second function of the application, the FID 457 may include second identification information (for example, 0002).

The present disclosure is not limited to any particular type of function of a given application. For example, if the application is a media player, the first function may be a set of functions including at least one (for example, video quality control) of functions provided by the media player, such as video quality control, volume control, fast forward, rewind, and forward, and the second function may be a function set including at least one other function (for example, volume control) than the first function.

In another example, if the application is a remote control application for controlling another electronic device, the first function may be a function set including at least one (for example, a call function) of the Internet, an information search function, the call function, and a vital sign measuring function (for example, a function of measuring pulses, heartbeat, or a glucose level) that may be provided (for example, executed) by, for example, the electronic device 401 or another electronic device (for example, the second external device 350), and the second function may be a function set including at least one other function (for example, the vital sign measuring function) than the first function.

According to an embodiment, an application corresponding to data may be a messenger application supporting a plurality of chat groups including a first chat group and a second chat group. In this case, functions supporting the respective chat groups may be different functions of the application. For example, a user of the electronic device 401 may converse with the first chat group by a first function and chat with the second chat group by a second function. According to an embodiment, if the data 450 is a message transmitted by an electronic device of the other party belonging to the first chat group, the FIT 457 may include, for example, first identification information (for example, 00001) that identifies the first chat group from another chat group (for example, the second chat group). On the other hand, if the data 450 is a message transmitted by an electronic device of the other party belonging to the second chat group, the FIT 457 may include, for example, second identification information (for example, 00002) that identifies the second chat group from another chat group (for example, the first chat group). An identification number of a chat group may be included instead of identification information about a function, or additionally.

The content 459 may include, for example, a number, a symbol, a character, a character sequence, text, a sound (for example, a human voice, a sound recorded from an ambient environment of the electronic device 401, or music), a still image (for example, a picture, a joint photographic coding experts group (JPG) file, or a portable document format (PDF) file), or a video (for example, a music video, movie content, or a video recorded using various electronic devices). According to an embodiment, the content 459 may further include a specific control signal for controlling the electronic device 401 or another electronic device.

According to various embodiments, a part of the destination IP 451, the source IP 453, the UID 455, the FID 457, and the content 459 may not be included in the data 450 or may be replaced with other information in the structure of the data 450 illustrated in FIG. 4. For example, the data may not include the FID 457 and may be replaced with a priority level of the data. According to an embodiment, the data may further include other information in addition to the aforedescribed types of information.

The data processing module 413 may select at least one of the electronic device 401 and one or more other external devices (for example, the second external device 350) (hereinafter, referred to as 'second external devices'), to output at least a part of data to a user. For example, the data processing module 413 may identify at least one of: (i) a service (for example, an application, a function, or a priority level corresponding to the application) and (ii) content (for example, a priority level corresponding to the content) corresponding to the data, and select a device for outputting at least a part of the data based on the determined service and/or content.

According to an embodiment, the data processing module 413 may select at least one electronic device based on an application corresponding to the data. For example, if the data 450 is generated by or intended to be used by a first application (for example, a vital sign measuring application), the data processing module 413 may select a second external device (for example, a wearable electronic device) as an output device for outputting at least a part of the data 450. The second external device may be one that is attached to or implanted in the user, which may readily measure one or more vital signs of the user. On the other hand, if the data 450 is generated by or intended to be used by a second application (for example, a media player), the data processing module 413 may select an electronic device (for example, the electronic device 401) having a display that is larger than the display of the second external device, as an output device for outputting the data 450.

According to an embodiment, if there is a plurality of second external devices, the data processing module 413 may select at least one of the plurality of second external devices based on the application corresponding to the data. For example, the user may wear electronic glasses and an electronic bracelet which are capable of communicating with the electronic device 401. If the application corresponding to the data is a gaze recognition application for recognizing the gaze direction of the user, the data processing module 413 may select the electronic glasses over the electronic bracelet as a device for outputting at least a part of the data. On the other hand, if the application corresponding to the data is a motion measurement application for detecting the user's movements, the data processing module 413 may select, for example, the electronic bracelet attached to a wrist which may move more actively than other body parts of the user. The data processing module 413 may identify the application corresponding to the data, for example, based on the UID 455 included in the data.

According to an embodiment, if the data is associated with the first function of the application, the data processing module 413 may select the electronic device 401 to output at least a part of the data. On the other hand, if the data is associated with the second function of the application, the data processing module 413 may select the second external device to output at least a part of the data. According to an embodiment, the data processing module 413 may identify a function of the application, corresponding to the data based on the FID 457.

According to an embodiment, the data processing module 413 may select a device for outputting at least a part of the data based on the application corresponding to the data or priority associated with the application. For example, the data may include data corresponding to a first application (or a first function) to which a first priority level is assigned, and data corresponding to a second application (or a second function) to which a second priority level different from the first priority level is assigned.

According to an embodiment, upon receipt of first data having the first priority level, the data processing module 413 may select the electronic device 401 to output at least a part of the first data to the user, even though the second processor 430 is in the sleep state and cause the second processor 430 to transition from the sleep state to the active state. On the other hand, upon receipt of the second data with the second priority level, the data processing module 413 may select the second external device to output at least a part of the second data to the user. In some implementations, the selection of the second device may be further performed in consideration of (e.g., based on) the second processor 430 being in the sleep state and it may permit the second processor 430 to remain in the sleep state.

The data 450 may be prioritized according to at least one of, for example, a user setting, a user state, a state of the electronic device 401, and a data property. For example, if the user assigns a higher priority level to a specific application (for example, a call application) than another application (for example, a brain wave measuring application), data corresponding to the specific application may have priority over data corresponding to the other application. In another example, first data corresponding to the first function (for example, the first chat group) may have a higher priority level than second data corresponding to the second function (for example, the second chat group) in the same application (for example, the messenger application) by a user setting. In this case, the data processing module 413 may select, for example, the electronic device 401 (for example, a portable phone) as a device for outputting the first data, and the second external device (for example, a wearable device such as a watch) as a device for outputting the second data.

User states may be defined, for example, depending on whether the user is moving, whether the user sleeps, or whether a vital sign is normal. For example, if the user is moving at a first speed (for example, fast), the data processing module 413 may select an electronic watch worn around the user's wrist, which is capable of communicating with the electronic device 401. On the contrary, if the user is moving at a second speed (for example, slow) different from the first speed, the data processing module 413 may select, for example, the electronic device 401. States of the electronic device 401 may be defined, for example, according to an available battery capacity, temperature, a distance to the user, a location of the electronic device 401 relative to the user (for example, whether the display 440 is located at a position that allows sensing of the gaze of the user), or a used memory capacity. According to an embodiment, if the electronic device 401 has a first temperature (for example, about 15 degrees), the data processing module 413 may select an external device capable of exchanging communications with the electronic device 401. On the other hand, if the electronic device 401 has a second temperature (for example, about 5 degrees), the data processing module 413 may select, for example, the electronic device 401.

Data properties may be defined, for example, according to whether the content 459 includes information often accessed or used by the user, whether the content 459 includes a specific term, symbol, or image selected by the user, or whether the content 459 needs to be provided urgently to the user. According to an embodiment, if the content 459 includes a first image (for example, a picture of the user) selected by the user, the data processing module 413 may select the electronic device 401 as a device for outputting at least a part of the data 450. Or if the content 459 includes a predetermined type of image, such as an image that is not selected by the user (for example, an advertisement image), the data processing module 413, for example, may not provide the data 450 to any entity or may select an external device as a device for outputting at least a part of the data 450. [Table 1] illustrates exemplary information about data, stored as a table in the memory 480 according to various embodiments.

TABLE 1

| data | Application | UID | FID | Priority | External device | Output device | Content parser |
|------|-------------|-----|------|----------|-----------------|---------------|----------------|
| D1 | Kakao ™ | 001 | 0001 | 1 | Electronic watch | Electronic watch Smartphone (e.g., electronic device 401) | main |
| D2 | Line ™ | 002 | 0001 | 1 | Necklace | Necklace | Sub1 |
| D3 | Line ™ | 002 | 0002 | 4 | None | None | Sub2 |

Referring to [Table 1], data may be, for example, first data D1, second data D2, or third data D3. The UID of the first data D1 may be '001' identifying, for example, the Kakao application and the FID of the first data D1 may be '0001' identifying, for example, a specific function of the Kakao application. The priority level of the first data D1 may be set to, for example, '1' which is the highest priority level, and an electronic device related to the first data D1 may be 'electronic watch'. Devices for outputting at least a part of the first data D1 may be determined to be, for example, an electronic watch being the related external device and the electronic device 401 (which in this example is a smartphone).

The UID of the second data D2 may be '002' identifying, for example, the Line application and the FID of the second data D2 may be '0001' identifying, for example, a first function (for example, a first chat group) of the Line application. The priority level of the second data D2 may be set to, for example, '1' which is the highest priority level, and an electronic device related to the second data D2 may be 'necklace'. Devices for outputting at least a part of the second data D2 may be determined to be, for example, a necklace being the related external device.

The UID of the third data D3 may be '002' identifying, for example, the Line application and the FID of the third data D3 may be '0002' identifying, for example, a second function (for example, a second chat group) of the Line application. The priority level of the third data D3 may be set to, for example, '4' which is the lowest priority level, and an electronic device related to the third data D3 is 'none'. According to an embodiment, the third data D3 may not be output by any device due to the lowest priority level of the third data D3.

According to an embodiment, at least a part of the first, second, and third data D1, D2, and D3 may be decoded in different devices. For example, the content parser used for decoding one of the first, second, and third data D1, D2, and D3 may be varied according to a related device (for example, a source device, destination device, or output device of the data), a property of the data (for example, a service or content corresponding to the data), or the priority level of the data.

For example, referring to [Table 1], the content parser for the first data D1 may be 'main' and the first data D1 may be decoded in a destination device receiving the data (for example, the electronic device 401). For example, the first data D1 may be decoded through at least one of a first processor 410, a second processor 430, and a low power processor 460.

As another example, the content parser for the second data D2 may be 'sub1' and the second data D2 may be decoded in an external device, such as the necklace (for example, by at least one processor included in the necklace). As yet another example, the content parser for the third data D3 may be 'sub2' and the third data D3 may not be decoded in any device. Rather, the third data D3 may be deleted from the electronic device 401, for example, by a setting, upon expiration of a predetermined time period, or by a user input.

According to an embodiment, the data processing module 413 may include a content parser 413-1 for decoding the data 450 transmitted by, for example, the first external device. The content parser 413-1 may determine the contents, format, or amount of the data 450 that may be output to the user, for example, according to the performance or function of a device for outputting the data 450.

FIG. 4 illustrates an example in which the content parser 413-1 is included in the data processing module 413 and thus the first processor 410 decodes data. Additionally or alternatively, the content parser may be included in the second processor 430 or the low power processor 460 according to various embodiments. According to an embodiment, the content parser 413-1 may be included in an application executable in the electronic device 401. For example, a first application 491 may include a first content parser 491-1 for processing data related to the first application 491. In another example, a second application 493 may include a second content parser 493-1 for processing data related to the second application 493. According to an embodiment, the content parsers included in the first processor 410, the second processor 430, the low power processor 460, the first application 491, or the second application 493 may have a different performance according to the computing power of their host devices or the manner in which they are implemented. In this case, at least one appropriate content parser may be selected and used according to, for example, one or more characteristics of the data that is to be decoded (for example, a property of the data, an application (or function) corresponding to the data, or a processing path for the data).

[Table 2] illustrates various embodiments of processing data received from an external device using, for example, the content parser 413-1 in the data processing module 413.

TABLE 2

| data | Service | Information included in data | data processing information | Transmission data |
|---|---|---|---|---|
| D1 | SNS | PID + UID + bit stream (image + text) | UID + bit stream (image + text) | UID |
| D2 | SNS | PID + UID + bit stream (image + text) | (content parsable) UID + bit stream (image + text) | UID image + text |
| D3 | call | PID + phone number (#) | phone number (#) | phone number (#) |
| D4 | call | PID + phone number (#) | (phonebook checked) phone number (#) | phone number (#) (name displayed) |
| D5 | SMS | PID + phone number (#) + text | phone number (#) + text | phone number (#) + text |
| D6 | SMS | PID + phone number (#) + text | (phonebook checked) phone number (#) + text | Phone number (#) (name displayed) + text |

Referring to [Table 2], the first data D1 transmitted by a social networking service (SNS) corresponding to an external device (for example, the first external device 330) may include, for example, a personal identification (PID), a UID, or a bit stream. The PID may include, for example, a personal number of a user (a user transmitting the data) or identification information about the user (for example, the name or SNS identification (ID) of the user). The bit stream may include, for example, an image or text as a video processing technique.

Referring to [Table 2], the data processing module 413 may provide a 'notification' inform the user that the first data D1 (or at least a part of the first data D1) is received from the SNS at the first processor 410. For this purpose, the data processing module 413 may identify, for example, the UID and bit stream of the first data D1 by using the content parser 413-1, which is included in the first processor 410. According to [Table 2], if the content parser 413-1 lacks the capability to parse (or decode) the first data D1, the image and text included in the first data D1, for example, may not be decoded. In this case, at least a part of the first data D1 may be transmitted to an external device or the second processor 430 along with an associated UID.

On the other hand, according to [Table 2], the first processor 410 receiving the second data D2 from an SNS may have the capability to parse the second data D2. For example, the data processing module 413 may decode at least a part of a UID, an image, and text included in the second data D2 using the content parser 413-1. In this case, the data processing module 413 may transmit the decoded data to an external device (for example, the second external device 350) or the second processor 430, for example, using the communication control module 415.

Each of third data D3 and fourth data D4 transmitted through a call application may include, for example, a PID and a caller number (#). To provide a notification indicating reception of the third data D3 or the fourth data D4 (or at least a part of the data) at the first processor 410, the data processing module 413 may identify the caller number (#) corresponding to the received data using, for example, the content parser 413-1. The data processing module 413 may transmit the caller number (#) to an external device (for example, the second external device 350) or the second processor 430 using, for example, the communication control module 413. According to an embodiment, the data processing module 413 may acquire contact information (for example, a name, an address, another phone number, or an email address) corresponding to the caller number (#) of, for example, the fourth data D4 by searching contact information (for example, a phonebook) stored in the electronic device 401 using, for example, the content parser 413-1. The data processing module 413 may transmit at least a part (for example, the name) of the acquired contact information to the external electronic device 350 or the second processor 430 instead of the caller number (#) or additionally to the caller number (#) using, for example, the communication control module 415.

Each of fifth data D5 and sixth data D6 transmitted by SMS may include, for example, a PID, a caller number (#), and text. The text may be written in, for example, ASCII code. To provide a notification indicating reception of at least a part of the fifth data D5 or the sixth data D6, the data processing module 413 may identify the text and the caller number (#) of the fifth data D5 or the sixth data D6 using, for example, the content parser 413-1. In this case, the data processing module 413 may transmit the caller number (#) or text of the fifth data D5 to an external device or the second processor 430 using, for example, the communication control module 413. According to an embodiment, the data processing module 413 may transmit the caller number (#) or text of the sixth data D6 together with identified caller name information to an external device or the second processor 430 using, for example, the communication control module 413.

The data processing information in Table 2 is provided only as an example. According to various embodiments, at least part of the data processing information may be replaced with other information or omitted according to the function or performance of the data processing module 413 (for example, the content parser 413-1). According to various embodiments, the data processing information may include other information than listed in [Table 2], and different information may be transmitted to the second processor 430 or the second external device according to processed information.

The communication control module 415 may determine the transmission path of the data based on which device is selected. For example, if the electronic device 401 is selected, the communication control module 415 may transmit at least a part of the data from the first processor 410 to the second processor 430. On the other hand, if the second external device is selected, the communication control module 415 may transmit at least a part of the data from the first processor 410 to the second external device, rather than to the second processor 430. In this case, the communication control module 415 may transmit at least part of the data to the second external device through, for example, a second communication module (for example, the communication module 325) of the electronic device 401.

According to an embodiment, the communication control module 415 may transmit the data decoded by the data processing module 413 to the second processor 430 or the second external device. In another example, the communication control module 415 may transmit at least a part of the data to the second processor 430 or the second external device without decoding it first. In such instances, at least a part of the undecoded data may be decoded in the second processor 430, the low power processor 460, an application corresponding to the undecoded data (for example, the first or second application 491 or 493), or the second external device.

According to an embodiment, if the second processor 430 is in the sleep state, the communication control module 415 may transition the second processor 430 into the active state in order to transmit at least a part of the data to the second processor 430. For example, the communication control module 415 may switch the second processor 430 from the sleep state to the active state by transmitting an interrupt signal to the second processor 430.

According to an embodiment, if the second processor 430 is in the sleep state, the communication control module 415 may, for example, store at least temporarily at least a part of the data in a memory 480 operatively connected to the electronic device 401 in order to transmit the at least part of the data to the second processor 430. According to an embodiment, after the second processor 430 enters the active state, at least a part of the stored data may be retrieved from the memory 480 by the second processor 430. For example, the active-state second processor 430 may read out at least a part of the data stored in the memory 480.

According to another embodiment, at least a part of the data stored in the memory 480 may be automatically deleted according to a setting, upon expiration of a predetermined time period, or without an additional user input. For example, data of a spam message, a phishing message, or voice phishing may automatically be deleted immediately after reception of the data, or upon expiration of a predetermined time period, without being provided to a user. In some embodiments, if the data includes user-set text, term, or image, the data stored in the memory 480 may be deleted automatically without a user input.

According to an embodiment, the communication control module 415 may determine whether to transition the second processor 430 into the active state according to the priority level of the data. For example, if the priority level of the data is a first priority level (for example, "high"), the communication control module 415 may switch the second processor 430 from the sleep state to the active state. On the other hand, if the priority level of the data is a second priority level (for example, "low"), the communication control module 415 may permit the second processor 430 to remain in the sleep state and store at least a part of the data in the memory 430. According to an embodiment, the communication control module 415 may determine whether to switch the second processor 430 to the active state based on at least one of a user state, a state of the electronic device 401, a service corresponding to the data, and content corresponding to the data, as well as the priority level of the data.

The second processor 430 may output, for example, at least a part of the data to the user through one or more output devices. According to an embodiment, the second processor 430 may vary the manner in which the data is output to the user based on a part of the data (for example, a service or content corresponding to the data). For example, if the data corresponds to the first application, the second processor 430 may provide at least part of the data to the user by sound. On the other hand, if the data corresponds to the second application, the second processor 430 may visually output at least a part of the data on the display 440. In another example, if the data corresponds to the first function of the first application, the second processor 430 may output the at least part of the data by vibration. On the other hand, if the data corresponds to the second function of the first application, the second processor 430 may output the at least part of the data, as visual information, on the display 440.

According to an embodiment, the second processor 430 may represent at least a part of the data in various manners by using any of the first to fourth user interfaces 471, 473, 475, and 477. The first user interface 471 may include, for example, a representation 471-1 of an application (a messenger application such as ChatON) corresponding to the data to distinguish the application from other applications. The second user interface 473 may include, for example, the representation 471-1, text 473-1 indicating the presence of a new message, or a menu 473-3 for receiving a user input to view a new message or eliminate the second user interface 473 from the display 440. The third user interface 475 may include, for example, the representation 471-1 or a part 475-1 of the content 459 that is part of the data. The part 475-1 may include, for example, text or an image (not shown) included in the content 459. The fourth user interface 477 may include, for example, another part 477-1 (for example, a user interface for downloading a file from an external device) in addition to the information included in the third user interface 475.

According to an embodiment, information about data that may be output to the user may be determined according to at least a part of the data transmitted from the first processor 410 to the second processor 430. For example, if the UID 455 of the data is transmitted from the first processor 410 to the second processor 430, the second processor 430 may determine data to be provided to the user (for example, the representation 471-1) by using the data processing module 431 and display the determined data on the display 440. In another example, if the content 459 of the data is transmitted from the first processor 410 to the second processor 430, the second processor 430 may display at least a part of the content 459 by using the data processing module 431.

According to an embodiment, the second processor 430 may select a device for outputting at least a part of the data received through the first processor 410 by using the data processing module 431 or the communication control module 433. If an external device (for example, the second external device 350) is selected to output the data, the second processor 430 may transmit at least a part of the data to the selected external device (for example, the second external device 350) using the second communication module 420 instead of the communication control module 433 or in addition to the communication control module 433.

According to an embodiment, the low power processor 460 may include at least one of, for example, a data processing module 461 and a communication control module 461. The data processing module 463 and the communication control module 461 included in the low power processor 460 may perform similar functions to those of the data processing module 431 and the communication control module 433. For example, the low power processor 460 may receive data from the first processor 410. In this case, the low power processor 460 may select a device for outputting at least a part of the data using at least one of the data processing module 461 and the communication control module 463, and determine a data transmission path based on the selected device.

If the electronic device 401 is selected, the low power processor 460 may transmit at least a part of the data to the second processor 430 using, for example, the communication control module 463. On the other hand, if the second external device is selected, the low power processor 460 may transmit at least a part of the data to the second external device using, for example, the communication control module 463 or the second communication module 420. In such instances, the low power processor 460 may not use, for example, the second processor 430. According to an embodiment, the low power processor 460 may include a set of one or more processors or a set (for example, a sensor hub) of sensors (for example, the sensor modules 240), which have power consumptions different from (for example, higher or lower than) the power consumptions of the first processor 410 (for example, a CP) and the second processor 430 (for example, an AP).

While operations or modules have been described above with reference to FIG. 4, the operations or modules that can be implemented in the electronic device 401 may be implemented in, for example, an external device (for example, the first and second external devices 330 and 350). For example, the description given of FIG. 4 is applicable to a wearable electronic device, a home appliance, or other various electronic devices communicable with the electronic device 401.

While the first communication module 411, the data processing module 413, and the communication control module 415 of the first processor 410 have been illustrated and described as separate blocks with reference to FIG. 4, for the convenience of description, the first communication module 411, the data processing module 413, and the communication control module 415 may be incorporated into one module. Or some of the first communication module 411, the data processing module 413, and the communication control module 415 may be incorporated into one module, so that the first communication module 411, the data processing module 413, and the communication control module 415 may be incorporated into two modules. Further, at least a part of operations perfumed in one module may be performed in, for example, another module. According to various embodiments, the first processor 410 may further include an additional module according to functions, a circuit design, or a logic structure, besides the foregoing modules. According to an embodiment, although the first processor 410 and the second processor 430 may be configured as physically separate components (for example, separate chips), they may be implemented as logically separate components in terms of functions or operations.

According to various embodiments, an electronic device may include a first processor and a second processor, receive data transmitted by an external device for the electronic device using the first processor, and determine an output device for outputting the data using the first processor. If the output device is the electronic device, the electronic device may transmit at least a part of the data to the second processor using the first processor. If the output device is another external device for the electronic device, the electronic device may transmit the at least part of the data to the other external device.

According to various embodiments, an electronic device may include a first processor for receiving data transmitted by an external device, and a second processor for receiving the data from the first processor. The first processor determines a service or content corresponding to the data. If the data corresponds to a first service or first content, the first processor may transmit at least a part of the data to the second processor. If the data corresponds to a second service or second content, the first processor may transmit the at least part of the data to another external device for the electronic device.

According to various embodiments, while the second processor is in the sleep state, the first processor may transmit the at least part of the data to the other external device.

According to various embodiments, the first processor may transmit the at least part of the data to the other external device without using the second processor.

According to various embodiments, the first service may include a first function of an application, and the second service may include a second function of the application.

According to various embodiments, the other external device may include a first external device and a second external device. If the second service includes the first function of the application, the first processor may transmit the at least part of the data to the first external device. If the second service includes the second function of the application, the first processor may transmit the at least part of the data to the second external device.

According to various embodiments, the first processor may switch the second processor from the sleep state to the active state.

According to various embodiments, if the first service has a predetermined priority level, the first processor may switch the second processor from the sleep state to the active state.

According to various embodiments, the first processor may determine the priority level based on a user setting, a state of a user, a state of the electronic device, a property of the data, or an application that generates or uses the data.

According to various embodiments, the electronic device may further include a short-range communication module, and the first processor may transmit the at least part of the data to the other external device using the short-range communication module.

According to various embodiments, the electronic device may include a first output device and a second output device. If the first service includes the first function, the second processor may provide the at least part of the data through the first output device. If the first service includes the second function, the second processor may provide the at least part of the data through the second output device.

According to various embodiments, the electronic device may include a first output device and a second output device. If the first service includes a first application, the second processor may provide the at least part of the data through the first output device. If the first service includes a second application, the second processor may provide the at least part of the data through the second output device.

According to various embodiments, if the data corresponds to a third service or third content, the electronic device may automatically delete the at least part of the data from the electronic device.

According to various embodiments, the data may be received while the second processor is in the sleep state.

According to various embodiments, the first service may include a first application, and the second service may include a second application.

According to various embodiments, the other external device may include a first external device and a second external device. If the second service includes a first application, the first processor may transmit the at least part of the data to the first external device. If the second service includes a second application, the first processor may transmit the at least part of the data to the second external device.

According to various embodiments, if the second processor is in the sleep state, the first processor may maintain the second processor in the sleep state.

According to various embodiments, the first processor may store the at least part of the data in a memory operatively connected to the electronic device.

According to various embodiments, if the second processor is placed in the active state, the at least part of the data may be transmitted from the memory to the second processor.

According to various embodiments, the other external device may include a first external device and a second external device. If the second service includes a first application, the first processor may transmit the at least part of the data to the first external device. If the second service includes a second application, the first processor may transmit the at least part of the data to the second external device.

According to various embodiments, the electronic device may include a first processor and a second processor. The first processor receives data from a first external device for the electronic device, selects at least one of the electronic device and a second external device for the electronic device to output at least a part of the data. If the electronic device is selected, the first processor may transmit the at least part of the data to the second processor. If the second external device is selected, the first processor may transmit the at least part of the data to the second external device without using the second processor.

According to various embodiments, the data may be received while the second processor is in the sleep state.

According to various embodiments, the first processor may identify an application corresponding to the data, and select the at least one device based on the application.

According to various embodiments, the second external device may include a third external device and a fourth external device. If the application is a first application, the first processor may select the third external device. If the application is a second application, the first processor may select the fourth external device.

According to various embodiments, the first processor may determine a priority level of the data and select the at least one device based on the priority level.

According to various embodiments, the first processor may determine that the second processor is in the sleep state. If the priority level is a first priority level, the first processor may switch the second processor from the sleep start to the active state. If the priority level is a second priority level, the second processor may be maintained in the sleep state.

According to various embodiments, if the second processor is in the sleep state, the first processor may store the at least part of the data in a memory operatively connected to the electronic device.

According to various embodiments, if the second processor is placed in the active state, the stored at least part of the data may be transmitted from the memory to the second processor.

According to various embodiments, the at least part of the data may be transmitted to the second external device while the second processor in the sleep state.

According to various embodiments, the first processor may select the at least one device based on a part of the data.

According to various embodiments, the first processor may determine a function of an application corresponding to the data and select the at least one device based on the function.

According to various embodiments, the second external device may include a third external device and a fourth external device. If the function is a first function, the first processor may select the third external device. If the function is a second function, the first processor may select the fourth external device.

According to various embodiments, the first processor may determine a priority level of the data and select the at least one device based on the priority level. According to various embodiments, if the data corresponds to a first function, the second processor may provide the at least part of the data through a first output device. If the data corresponds to a second function, the second processor may provide the at least part of the data through a second output device.

According to various embodiments, the first processor may determine the priority level based on a user setting, a state of a user, a state of the electronic device, a property of the data, or an application that generates or uses the data.

According to various embodiments, the electronic device may further include a low power processor configured to transmit the at least part of the data to the second processor or the external device based on the service or the content.

Figure 5A:
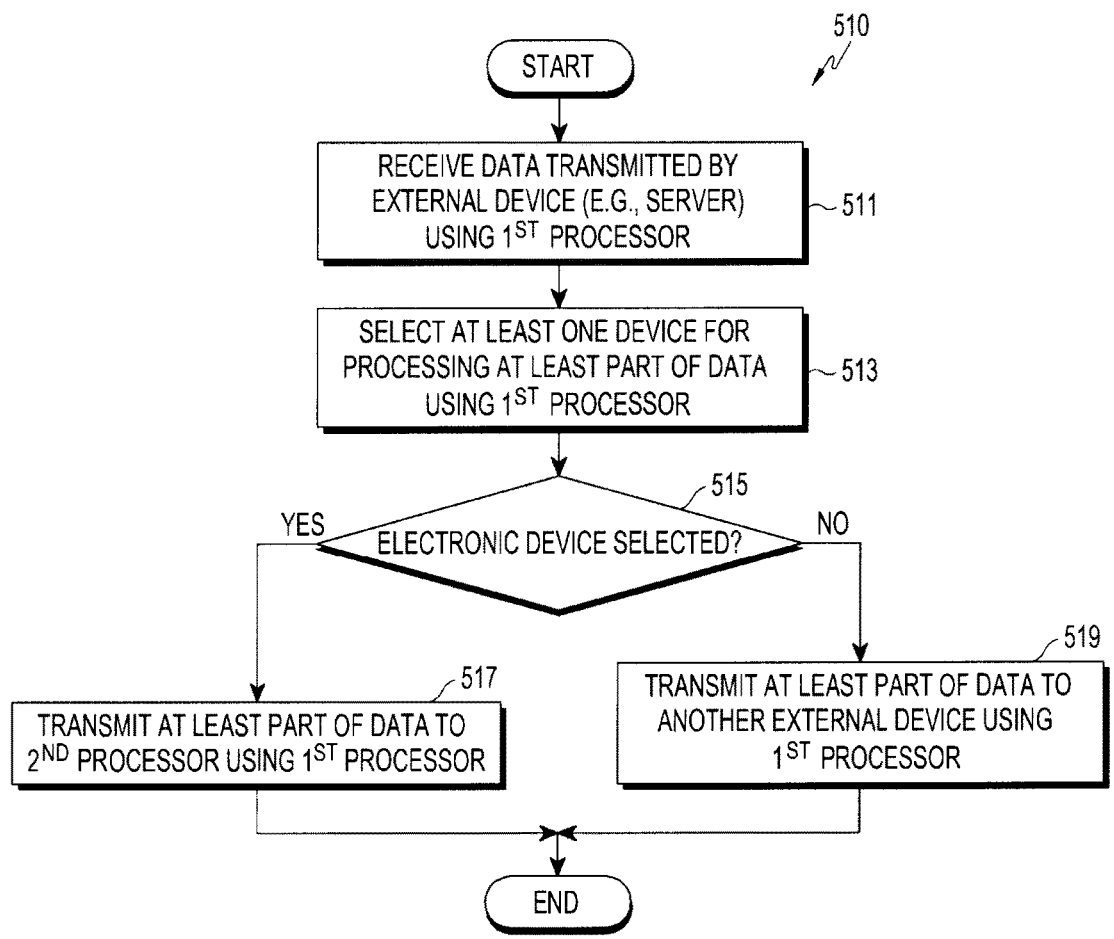
FIG. 5A is a flowchart is a flowchart of an example of a process, according to various embodiments.

FIG. 5A is a flowchart of an example of a process 510, according to various embodiments.

In step 511, the electronic device (for example, the electronic device 401) may receive data transmitted by an external device (for example, the first external device 330) such as a server or a wearable device using, for example, a first processor (for example, the first processor 410) in step 511.

In step 513 the electronic device may select at least one recipient device for the data. The recipient device may be a device for processing (for example, outputting) at least a part of the received data. The recipient device may be selected from among a plurality of electronic devices including the electronic device and one or more other external devices (for example, the second external device 350). The recipient device may be selected by using the first processor.

In step 515, for example, the electronic device may determine whether the electronic device has been selected, using the first processor. In other words, the electronic device may determine whether it has selected itself.

In step 517, if the electronic device has been selected, the electronic device may transmit at least a part of the data to a second processor (for example, the second processor 430) included in the electronic device. The transmission may be performed by using the first processor in step 517.

In step 519, if an external device has been selected, the electronic device may transmit the at least part of the data to the external device. The transmission may be performed by using the first processor. According to an embodiment, the at least part of the received data may be transmitted from the first processor to the external device without passing through the second processor.

Figure 5B:
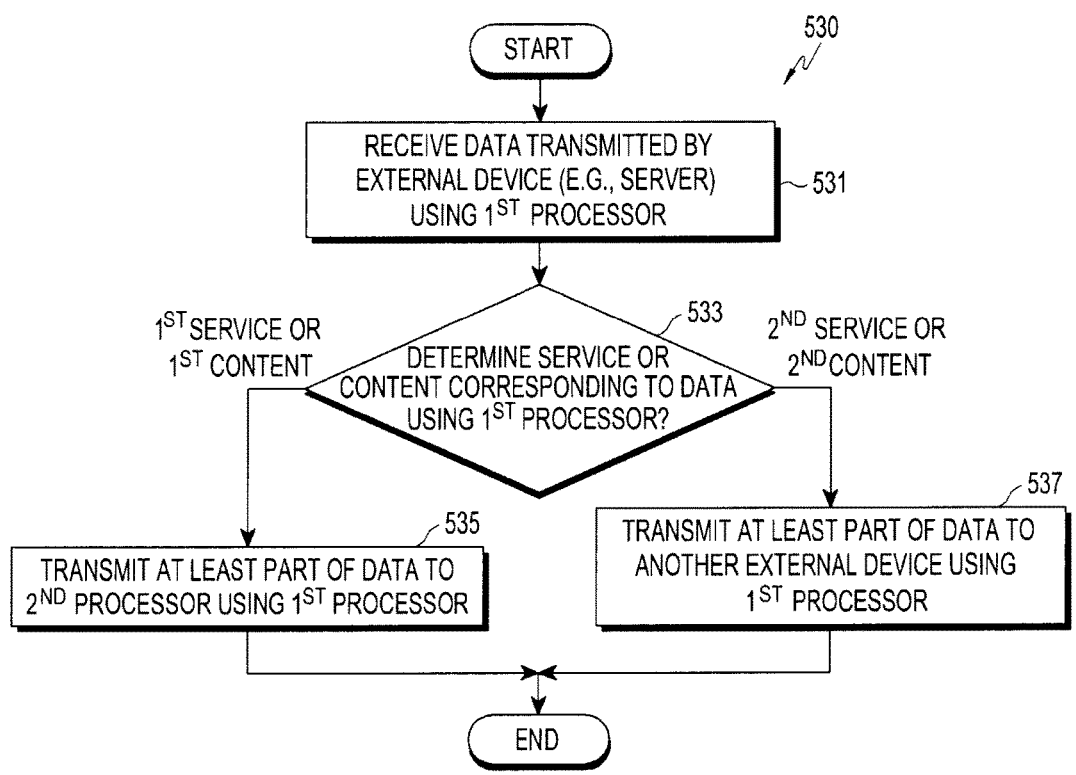
FIG. 5B is a flowchart is a flowchart of an example of a process, according to various embodiments.

FIG. 5B is a flowchart of an example of a process 530, according to various embodiments of the present disclosure. In step 531, the electronic device (for example, the electronic device 401) may receive data from an external device (for example, the first external device 330) such as a server or a wearable device. The data may be received by using a first processor (for example, the first processor 410).

In step 533, for example, the electronic device may determine a service or content (or a priority level) corresponding to the received data. The service or content may be identified by using the first processor.

In step 535, in response to detecting that the data corresponds to at least one of a first service or a first content (or a first priority level), the electronic device may transmit at least a part of the received data to a second processor included in the electronic device (for example, the second processor 430). The data may be transmitted to the second processor by using the first processor.

In step 537, in response to detecting that the data corresponds to at least one of a second service or a second content (or a second priority level), the electronic device may transmit the at least part of the received data to an external device (for example, the second external device 350). According to an embodiment, the at least part of the received data may be transmitted from the first processor to the external device without passing through the second processor.

Figure 6A:
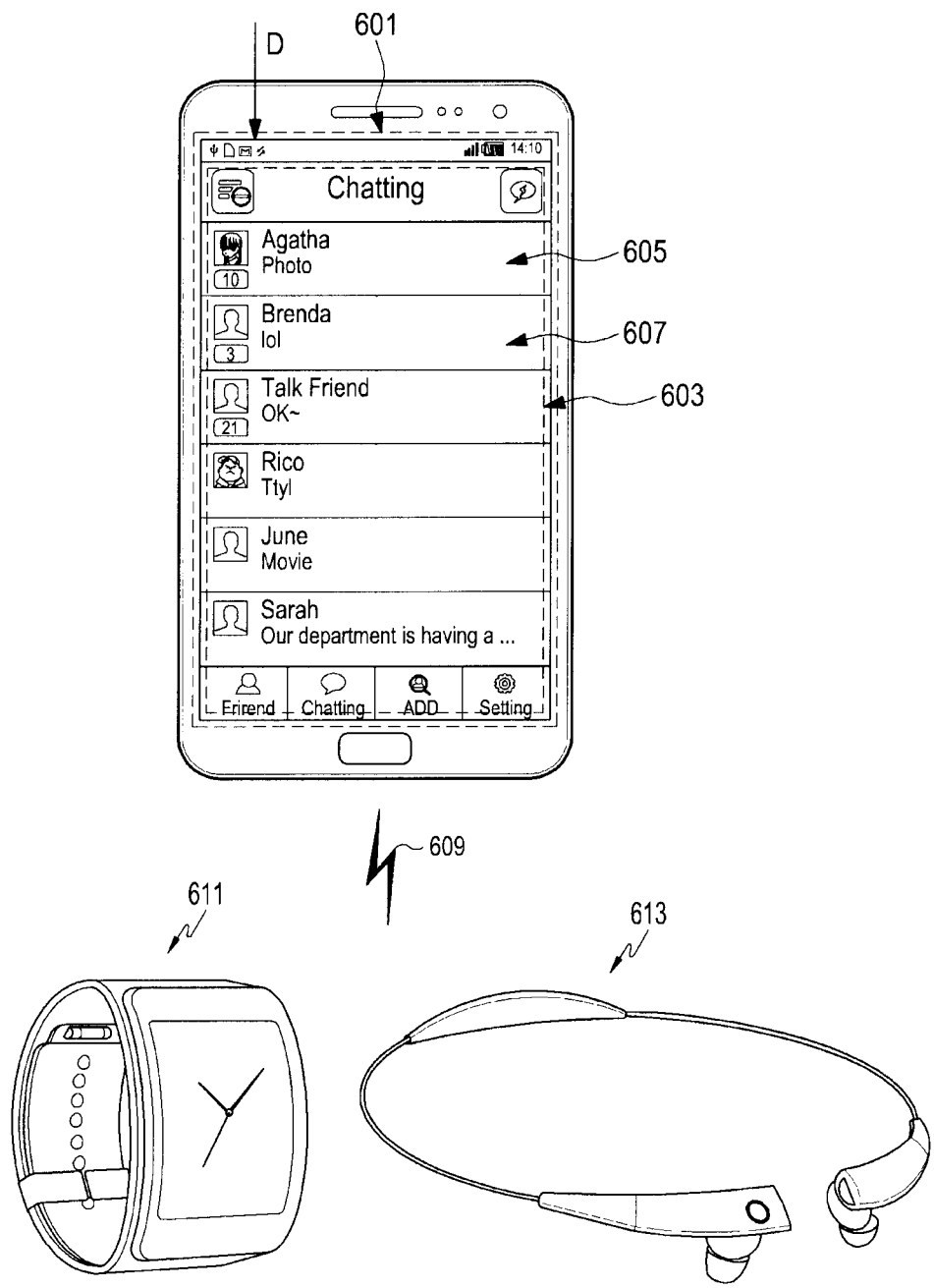
FIG. 6A is a diagram of an example of a system, according to various embodiments.
Figure 6B:
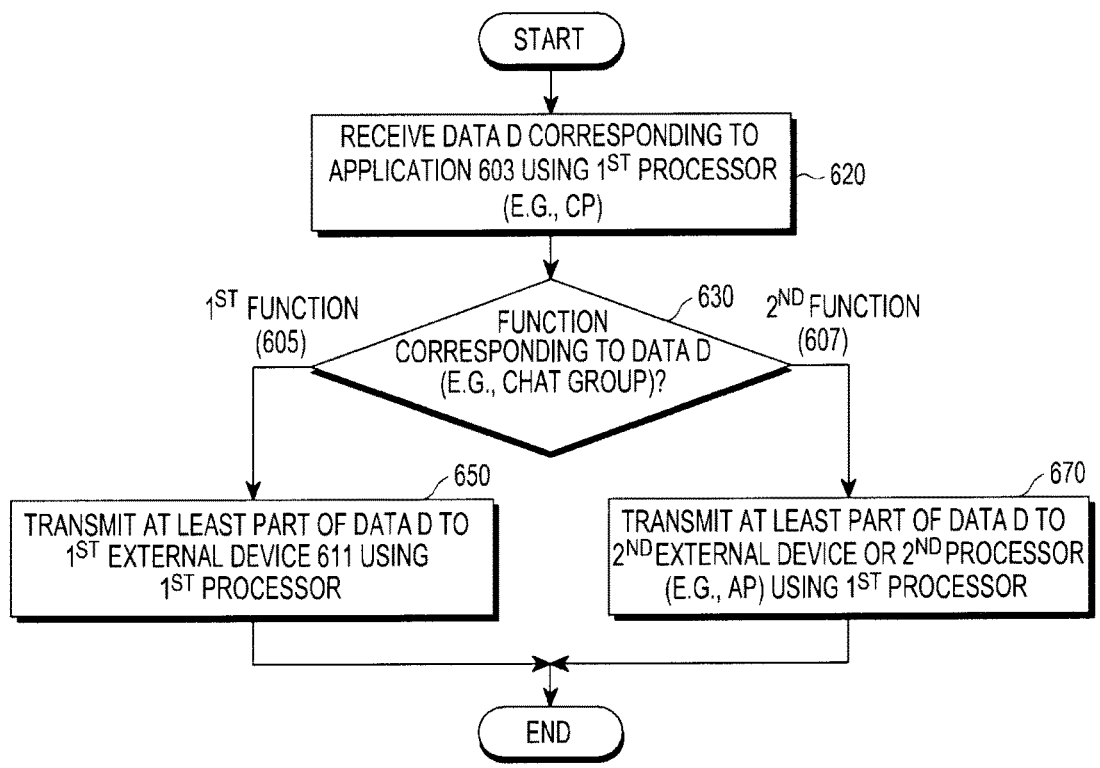
FIG. 6B is a flowchart of an example of a process, according to various embodiments.

FIG. 6A illustrates an example of a system and FIG. 6B is a flowchart of a process performed by the system, according to various embodiments. The same part as or a similar part to in FIGS. 5A and 5B will not be described herein.

In step 620, an electronic device 601 (for example, the electronic device 401) may receive data corresponding to an application 603 (for example, a chat application) that is executed by the electronic device 601. The data may be received by using, for example, a first processor (for example, a CP or a low power processor).

In step 630, the electronic device 601 may determine a function (for example, a chat group) of the application 603 that is associated with the data.

In step 650, if the data is associated with a first function 605 (for example, a first chat group), the electronic device 601 may transmit at least a part of the data to a first external device 611 (for example, an electronic watch). The transmission may be performed by using, for example, the first processor. In this case, the electronic device 601 may, for example, maintain the second processor in the sleep state. Thus, the electronic device 601 may transmit the at least part of the data to the first external device 611 without using the second processor.

In step 670, if the data is associated with a second function 607 (for example, a second chat group), the electronic device 601 may transmit the at least part of the data to a second external device 613 (for example, an electronic necklace) and the second processor (for example, an AP). The transmission may be performed by using, for example, the first processor. According to an embodiment, the electronic device 601 may transmit the at least part of the data to the first external device 611 or the second external device 613 through short-range communication 609 (for example, the short-range communication 364).

Figure 7:
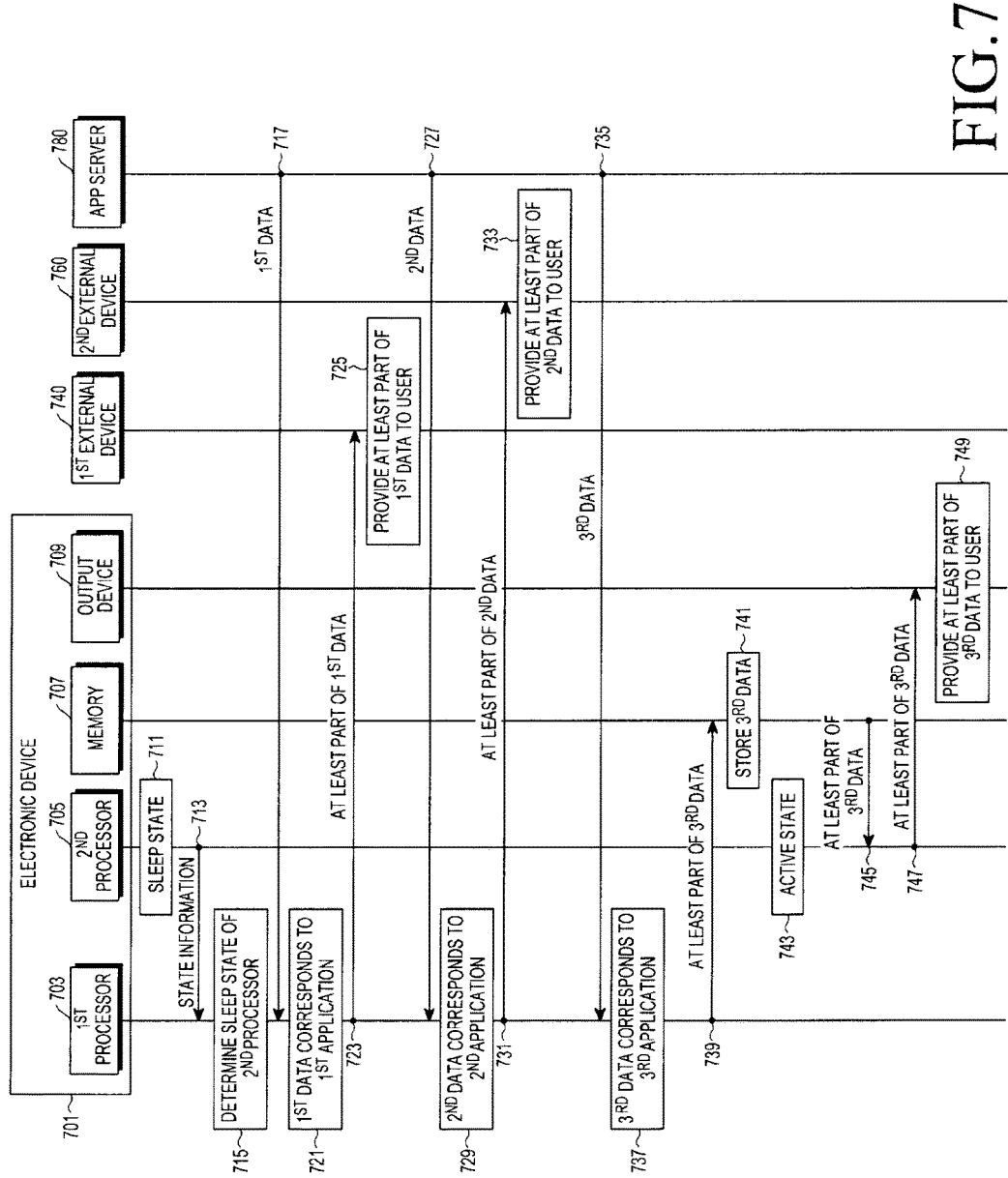
FIG. 7 is a sequence diagram of an example of a process, according to various embodiments.

FIG. 7 is a diagram of an example of a process, according to various embodiments. The same part as or a similar part to in FIGS. 1 to 6 will not be described herein. Referring to FIG. 7, an electronic device 701 (for example, the electronic device 601) may exchange data with a first external device 740, a second external device 760, or an app server 780, for example, in a network environment supporting various communication schemes.

According to an embodiment, the electronic device 701 may include a first processor 703 (for example, the first processor 410), a second processor 705 (for example, the second processor 430), a memory 707 (for example, the memory 480), and an output device 709 (for example, the display 440). The second processor 705, for example, may transition from the active state to the sleep state in step 711, and may transmit to the first processor 703, for example, state information indicating the sleep state of the second processor 705 in step 713. In step 715, the first processor may, for example, determine the sleep state of the second processor 705 based on the received state information.

In step 717, the first processor 703 may receive first data, for example, from the app server 780. The first processor 703 may, for example, determine that the first data corresponds to a first application in step 721 and may transmit at least a part of the first data to the first external device 740 in response to determining that the first data corresponds to the first application in step 723. Upon receipt of the at least part of the first data, the first external device 740 may output the at least part of the first data for presentation to a user, for example, in various output schemes (for example, scent) in step 725. In such instances, the second processor 705 may be maintained, for example, in the sleep state.

In step 727, the first processor 703 may receive second data, for example, from the app server 780. The first processor 703 may, for example, determine that the second data corresponds to a second application in step 729. In step 731, the first processor 703 may transmit at least a part of the second data to the second external device 760, for example, in response to determining that the second data corresponds to the second application. Upon receipt of the at least part of the second data, the second external device 760 may, for example, output the at least part of the second data for presentation to the user by vibration, visual information, or sound in step 733. In such instances, the second processor 705 may remain in the sleep state.

In step 735, the first processor 703 may receive third data, for example, from the app server 780. The first processor 703 may, for example, determine that the third data corresponds to a third application in step 737. In step 739, the first processor 703 may transmit at least a part of the third data to the memory 707, for example, in response to determining that the third data corresponds to the third application. Next, the at least part of the third data may be stored in the memory 707 in step 741. According to an embodiment, the at least part of the third data may be compressed and stored in the memory 707.

In step 743, the second processor 705 may switch, for example, from the sleep state to the active state. For example, if there is data to be processed by the second processor 705, a new event occurs, or periodically according to a setting, the second processor 705 may transition into the active state. In step 745, the active-state second processor 705 may access, for example, the memory 707 and retrieve the at least part of the third data in step 745.

According to an embodiment, the second process 705 may process the at least part of the third data to a form suitable for a corresponding output device and transmit the processed part of the third data to the corresponding output device 709 in step 747. In step 749, the output device 709 may output the at least part of the third data for presentation to the user, for example, by various output schemes (for example, sound, visual information, scent, or vibration).

Figure 8:
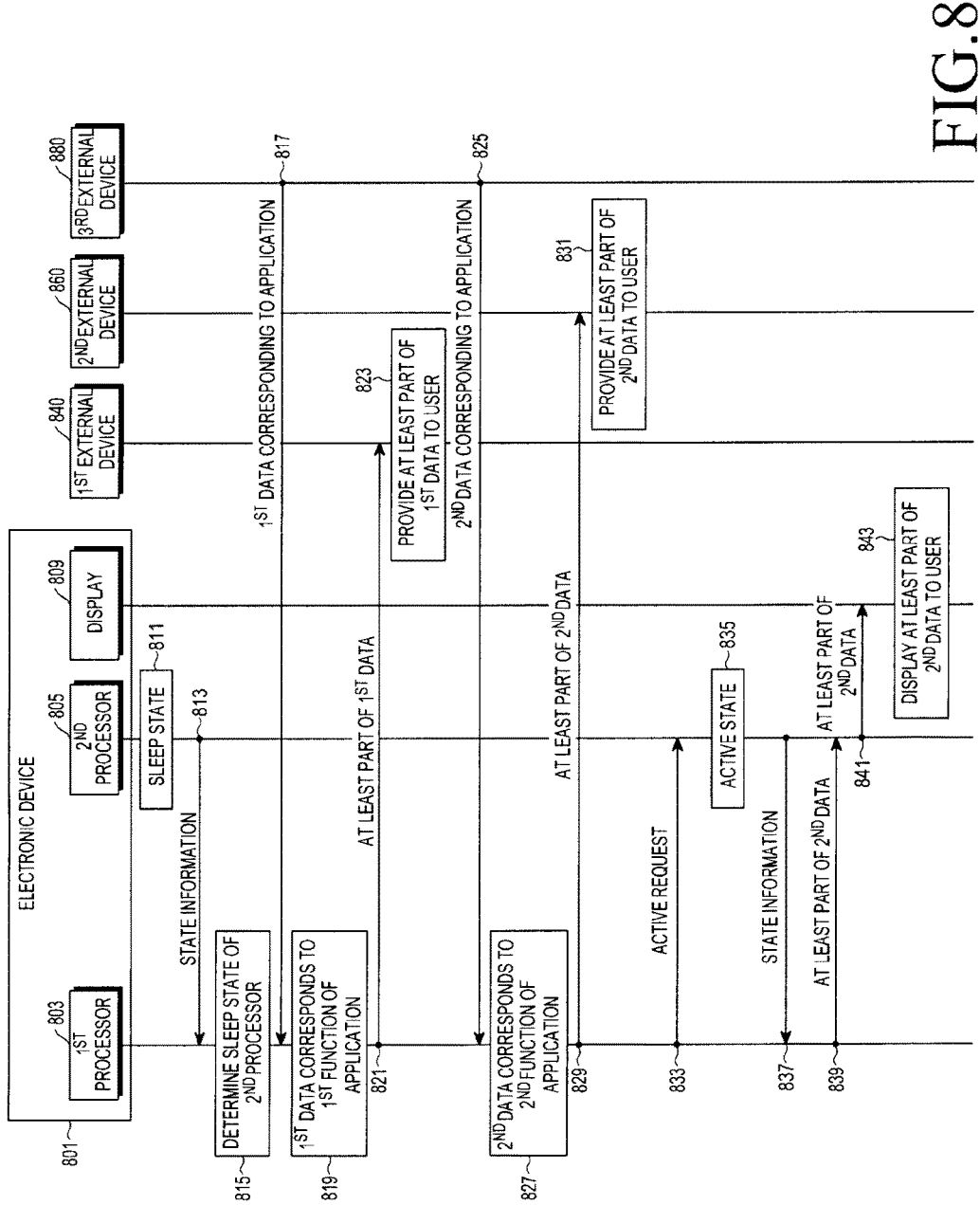
FIG. 8 is a sequence diagram of an example of a process, according to various embodiments.

FIG. 8 is a sequence diagram of an example of a process, according to various embodiments. The same part as or a similar part to in FIGS. 1 to 7 will not be described herein. Referring to FIG. 8, an electronic device 801 (for example, the electronic device 701) may transmit and receive data to and from a first external device 840, a second external device 860, or a third external device 880, in a network environment supporting, for example, various communication schemes.

According to an embodiment, the electronic device 801 may include a first processor 803 (for example, the first processor 703), a second processor 805 (for example, the second processor 705), and a display 809 (for example, the output device 709). The second processor 805 may transition, for example, from the active state to the sleep state in step 811, and may transmit, for example, state information indicating the sleep state of the second processor 805 to the first processor 803 in step 813. In step 815, the first processor 803 may determine, for example, the sleep state of the second processor 805 based on the received state information.

In step 817, the first processor 803 may receive first data corresponding to an application, for example, from the third external device 880. The first processor 803 may, for example, determine that the first data corresponds to a first function of the application in step 819 and may transmit at least a part of the first data to the first external device 840, for example, in response to determining that the first data corresponds to the first function of the application in step 821. Upon receipt of the at least part of the first data, the first external device 840 may output, for example, the at least part of the first data for presentation to a user in a first output scheme in step 823. In such instances, the second processor 805 may remain in the sleep state.

In step 825, the first processor 803 may receive second data corresponding to the application, for example, from the third external device 880. The first processor 803 may, for example, determine that the second data corresponds to a second function of the application in step 827. In step 829, the first processor 803 may transmit at least a part of the second data to the second external device 860, for example, in response to determining that the second data corresponds to the second function of the application. Upon receipt of the at least part of the second data, the second external device 860 may output, for example, the at least part of the second data for presentation to the user in a second output scheme in step 831. In such instances, the second processor 805 may be maintained, for example, in the sleep state.

According to an embodiment, to output the at least part of the second data using the electronic device 801, the first processor 803 may transmit an active request, for example, to the second processor 805 in step 833. In step 835, upon receipt of the active request, the second processor 835 may transition, for example, from the sleep state to the active state. The second processor 805 may transmit to the first processor 803, for example, state information 837 indicating that the second processor 805 is in the active state in step 837.

In step 839, the first processor 803 may directly transmit the at least part of the second data to the second processor 805, for example, in response to the state information indicating the active state. In another example, the first processor 803 may transmit the at least part of the second data as an interrupt signal to the second processor 805, unlike steps 833 to 839 of FIG. 8. In such instances, the second processor 805 may switch from the sleep state to the active state based on the received second data.

In step 841, the second processor 805 may transmit, for example, the at least part of the second data to the display 809. In step 843, the display 809 may display, for example, the at least part of the second data for presentation to a user. In such instances, a different amount of data may be displayed on the display 809 depending on a degree to which information included in the data is processed.

The plurality of operations described with reference to FIGS. 5 to 8 may be performed simultaneously or in parallel. According to various embodiments, a part of the plurality of operations may be omitted, and the plurality of operations may not necessarily be performed in the described order. For example, a first operation in an $N^{th}$ step may be performed after a second operation in an $(N+M)^{th}$ step. According to an embodiment, the first operation and the second operation may be performed simultaneously. Herein, N and M may be, for example, natural numbers.

According to various embodiments, a method for managing data in an electronic device including a first processor and a second processor may include receiving data transmitted by an external device for the electronic device, using the first processor, determining an output device for outputting the data, using the first processor, transmitting, if the output device is the electronic device, at least a part of the data to the second processor using the first processor, and transmitting, if the output device is another external device for the electronic device, the at least part of the data to the other external device using the first processor.

According to various embodiments, a method for managing data in an electronic device including a first processor and a second processor may include receiving data transmitted by an external device for the electronic device, using the first processor, determining a service or content corresponding to the data, using the first processor, transmitting, if the data corresponds to a first service or first content, at least a part of the data to the second processor using the first processor, and transmitting, if the data corresponds to a second service or second content, the at least part of the data to another external device for the electronic device, using the first processor.

According to various embodiments, the data may be received while the second processor is in a sleep state.

According to various embodiments, the first service may include a first application, and the second service may include a second application.

According to various embodiments, the other external device may include a first external device and a second external device. The transmission of the at least part of the data to the other external device may include transmitting the at least part of the data to the first external device, if the second service includes the first application, and transmitting the at least part of the data to the second external device, if the second service includes the second application.

According to various embodiments, the transmission of the at least part of the data to the second processor may include maintaining the second processor in the sleep state, if the second processor is in the sleep state.

According to various embodiments, the transmission of the at least part of the data to the second processor may include storing the at least part of the data in a memory operatively connected to the electronic device.

According to various embodiments, the transmission of the at least part of the data to the second processor may include switching the second processor from the sleep state to an active state.

According to various embodiments, the transmission of the at least part of the data to the second processor may include, if the second processor switches to the active state, transmitting the at least part of the data from the memory to the second processor.

According to various embodiments, if the second processor switches to the active state, the at least part of the data may be transmitted from the memory to the second processor.

According to various embodiments, the other external device may include a first external device and a second external device. The transmission of the at least part of the data to the other external device may include transmitting the at least part of the data to the first external device, if the second service includes a first application, and transmitting the at least part of the data to the second external device, if the second service includes a second application.

According to various embodiments, the transmission of the at least part of the data to the second external device may be performed, while the second processor is in the sleep state.

According to various embodiments, the transmission of the at least part of the data to the second external device may include transmitting the at least part of the data to the other external device without using the second processor.

According to various embodiments, the first service may include a first function of an application, and the second service may include a second function of the application.

According to various embodiments, the other external device may include a first external device and a second external device. The transmission of the at least part of the data to the other external device may include transmitting the at least part of the data to the first external device, if the second service includes a first function of an application, and transmitting the at least part of the data to the second external device, if the second service includes a second function of the application.

According to various embodiments, the electronic device may further include a short-range communication module, and the transmission of the at least part of the data to the other electronic device may include transmitting the at least part of the data to the other external device using the short-range communication module.

According to various embodiments, the transmission of the at least part of the data to the second processor may include, if the first service has a predetermined priority level, switching the second processor from the sleep state to the active state.

According to various embodiments, the transmission of the at least part of the data to the second processor may include determining the priority level based on a user setting, a state of a user, a state of the electronic device, or a property of the data.

According to various embodiments, the electronic device may include a first output device and a second output device. The transmission of the at least part of the data to the second processor may include, if the first service includes a first function, providing the at least part of the data through the first output device, and if the first service includes a second function, providing the at least part of the data through the second output device.

According to various embodiments, the electronic device may include a first output device and a second output device. The transmission of the at least part of the data to the second processor may include, if the first service includes a first application, providing the at least part of the data through the first output device, and if the first service includes a second application, providing the at least part of the data through the second output device.

According to various embodiments, the method may further include, if the data corresponds to a third service or third content, automatically deleting the at least part of the data from the electronic device.

According to various embodiments, the electronic device may further include a low power processor configured to transmit the at least part of the data to the second processor or the other external device based on the service or the content.

Figure 9:
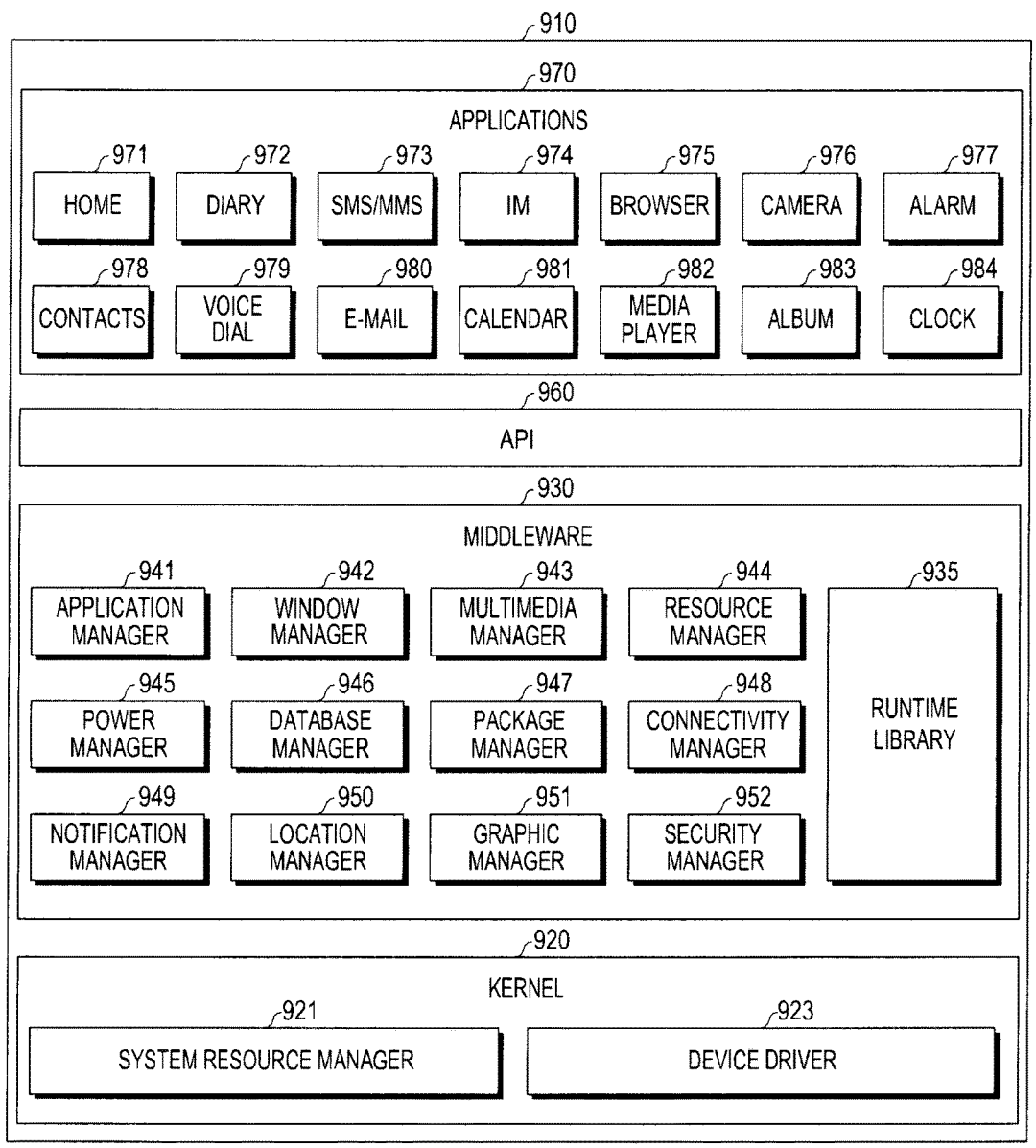
FIG. 9 is a block diagram of an example of a programming module, according to various embodiments.

FIG. 9 is a block diagram of a programming module according to various embodiments. According to an embodiment, a programming module 910 (for example, a program 140) may include an OS that controls resources related to an electronic device (for example, the electronic device 101) and/or various applications executed on the OS (for example, the application programs 147). For example, the OS may be Android, iOS, Windows, Symbian, Tizen, Bada, or the like.

The programming module 910 may include a kernel 920, middleware 930, an Application Programming Interface (API) 960, and/or applications 970. At least a part of the programming module 910 may be preloaded on an electronic device or downloaded from an external device (for example, the electronic devices 102 and 104, and the server 106).

The kernel 920 (for example, the kernel 141) may include, for example, a system resource manager 921 and/or a device driver 923. The system resource manager 921 may control, allocate, or deallocate system resources. According to an embodiment, the system resource manager 921 may include a process manager, a memory manager, or a file system manager. The device driver 923 may include, for example, a display driver, a camera driver, a Bluetooth driver, a shared memory driver, a USB driver, a keypad driver, a WiFi driver, an audio driver, or an inter-process communication (IPC) driver.

The middleware 930 may, for example, provide a function required commonly for the applications 970 or provide various functionalities to the applications 970 through the API 960 so that the applications 970 may efficiently use limited system resources available within the electronic device. According to an embodiment, the middleware 930 (for example, the middleware 143) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935 may include, for example, a library module that a compiler uses to add a new function in a programming language during execution of an application 970. The runtime library 935 may perform input/output management, memory management, a function related to arithmetic function, or the like.

The application manager 241 may manage, for example, the life cycle of at least one of the applications 970. The window manager 942 may manage GUI resources used for a screen. The multimedia manager 943 may determine formats required to play back various media files and may encode or decode a media file using a CODEC suitable for the format of the media file. The resource manager 944 may manage resources such as a source code of at least one of the applications 970, a memory, or storage space.

The power manager 945 may manage a battery or a power source by operating in conjunction with, for example, a basic input/output system (BIOS) and may provide power information required for an operation of the electronic device. The database manager 946 may generate, search, or modify a database for used in at least one of the applications 970. The package manager 947 may manage installation or update of an application distributed as a package file.

The connectivity manager 948 may manage wireless connectivity of, for example, WiFi, Bluetooth, or the like. The notification manager 949 may indicate or notify an event such as message arrival, a schedule, a proximity alarm, or the like in a manner that does not bother a user. The location manager 950 may manage position information about the electronic device. The graphic manager 951 may manage graphical effects to be provided to the user or related user interfaces. The security manager 952 may provide an overall security function required for system security, user authentication, and the like. According to an embodiment, if the electronic device (for example, the electronic device 101) has a telephony function, the middleware 930 may further include a telephony manager to manage a voice or video call function of the electronic device.

A new middleware module may be created and used by combining various functions of the above-described component modules in the middleware 930. The middleware 930 may provide a customized module for each OS type in order to provide differentiated functions. In addition, the middleware 930 may dynamically delete a part of the existing components or add a new component.

The API 260 (for example, the API 145) is, for example, a set of API programming functions, which may be configured differently according to an OS. For example, in the case of Android or iOS, one API set may be provided per platform, whereas in the case of Tizen, two or more API sets may be provided per platform.

The applications 970 (for example, the application programs 147) may include, for example, one or more applications capable of providing functions such as home 971, dialer 972, short message service/multimedia messaging service (SMS/MMS) 973, Instant message (IM) 974, browser 975, camera 976, alarm 977, contacts 978, voice dial 979, email 980, calendar 981, media player 982, album 983, or clock 984, healthcare (for example, measurement of an exercise amount or a glucose level), or providing of environment information (for example, information about atmospheric pressure, humidity, or temperature).

According to an embodiment, the applications 970 may include an application (for the convenience of description, referred to as 'information exchange application') supporting information exchange between the electronic device (for example, the electronic device 101) and an external electronic device (the electronic device 102 or 104). The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a healthcare application, or an environment information application) to the external electronic device (for example, the electronic device 102 or 104). Also, the notification relay application may, for example, receive notification information from the external electronic device and transmit the received notification information to the user.

The device management application may, for example, manage (for example, install, delete, or update) at least a part of functions of the external electronic device (for example, the electronic device 102 or 104) communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment, the applications 970 may include an application (for example, a health care application in a mobile medical equipment) designated according to a property of the external electronic device (for example, the electronic device 102 or 104). According to an embodiment, the applications 970 may include an application received from an external electronic device (for example, the server 106 or the electronic device 102 or 104). According to an embodiment, the applications 970 may include a preloaded application or a third party application downloadable from a server. The names of components of the programming module 910 according to embodiments of the present disclosure may vary according to the type of an OS.

According to various embodiments, at least a part of the programming module 910 may be implemented in software, firmware, hardware, or a combination of at least two of them. At least a part of the programming module 910 may be implemented (for example, executed), for example, by the processor (for example, the processor 210). At least a part of the programming module 910 may include, for example, a module, a program, a routine, a set of instructions, or a process to execute one or more functions.

As is apparent from the foregoing description of an electronic device and method for managing data using a plurality of processors according to various embodiments, for example, even though a first processor (for example, a CP) receives data, a second processor (for example, an AP) may be maintained in a sleep state based on at least a part of the data. Therefore, unnecessary current consumption involved in switching the second processor to an active state can be reduced.

According to the electronic device and method for managing data using a plurality of processors according to various embodiments, for example, data received at the first processor (for example, a CP) can be reserved from a user at least until the second processor (for example, an AP) switches to the active state, thereby preventing reception of unintended or low-priority data from frequently interrupting the user.

According to the electronic device and method for managing data using a plurality of processors according to various embodiments, while the second processor is in the sleep state, the data can be transmitted to an external device using the first processor (for example, a CP) that has received the data. Thus, the first processor (for example, a CP) which can operate independently without control of the second processor (for example, an AP) can be provided.

The term 'module' as used herein may include its ordinary meaning including, for example, a unit of one, or a combination of two or more of hardware, software, and firmware. The term 'module' may be used interchangeably with terms such as, for example, unit, logic, logical block, component or circuit. A 'module' may be the smallest unit of an integrated part or a portion thereof. A 'module' may be the smallest unit for performing one or more functions, or a portion thereof. A 'module' may be implemented mechanically, or electronically. For example, a 'module' may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

According to various embodiments, in a storage device storing commands, the commands are configured to make at least one processor to perform operations when the commands are executed by the at least one processor. In an electronic device including a first processor and a second processor, the operations may include receiving data transmitted by an external device for the electronic device, using the first processor, determining a service or content corresponding to the data, using the first processor, transmitting, if the data corresponds to a first service or first content, transmitting at least a part of the data to the second processor using the first processor, and transmitting, if the data corresponds to a second service or second content, transmitting at least a part of the data to another external device for the electronic device using the first processor.

FIGS. 1-9 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method for managing data in an electronic device including a first processor and a second processor, the method comprising:
   receiving, by the first processor, a message transmitted by a first external device;
   identifying, by the first processor, a service or an application corresponding to the message based on information of the message; and
   determining, by the first processor, whether to allow the second processor to display a notification of the message or to provide at least a portion of the message to a second external device which is operatively coupled with the electronic device, according to the identified service or application corresponding to the message.

2. The method of claim 1, wherein the message is received from the first external device while the second processor is in a sleep state.

3. The method of claim 2, wherein the second processor keeps in a sleep state while the electronic device provides the at least a portion of the message to the second external device using the first processor.

4. The method of claim 1, further comprising,
   storing, by the first processor, the message in a memory that is accessible by the second processor.

5. The method of claim 4, further comprising retrieving, by the second processor, the message from the memory when the second processor has been activated.

6. The method of claim 1, wherein the first processor comprises at least one communication processor and the second processor comprises at least one application processor, the at least one communication processor is configured to communicate with a cellular communicating base station and an external device in short range.

7. The method of claim 6, wherein the providing of the at least a portion of the message to the second external device comprises transmitting the at least portion of the message to the second external device through short range communication channel using the first processor.

8. The method of claim 1, wherein preset user setting determines whether to allow the second processor to display the notification of the message or to provide the at least a portion of the message to the second external device.

9. An electronic device comprising:
   a memory;
   a first processor operatively coupled to the memory; and
   a second processor operatively coupled to the memory,
   wherein the first processor is configured to:
   receive a message transmitted by a first external device,
   identify a service or an application corresponding to the message based on information of the message, and
   determining, by the first processor, whether to allow the second processor to display a notification of the message or to provide at least a portion of the message to a second external device which is operatively coupled with the electronic device, according to the identified service or application corresponding to the message.

10. The electronic device of claim 9, wherein the message is received from the first external device while the second processor is in a sleep state.

11. The electronic device of claim 10, wherein the second processor keeps in a sleep state while the electronic device provides the at least a portion of the message to the second external device using the first processor.

12. The electronic device of claim 9, wherein the first processor stores the message in the memory.

13. The electronic device of claim 12, wherein the second processor retrieves the message from the memory when the second processor has been activated based on the determination.

14. The electronic device of claim 9, wherein the first processor comprises at least one communication processor and the second processor comprises at least one application processor, the at least one communication processor is configured to communicate with a cellular communicating base station and an external device in short range.

15. The electronic device of claim 14, wherein the first processor transmits the at least a portion of the message to the second external device through short range communication channel using the first processor.

16. The electronic device of claim 9, wherein preset user setting determines whether to allow the second processor to display the notification of the message or to provide the at least a portion of the message to the second external device.

17. The electronic device of claim 9, further comprising a low-power processor configured to provide the at least a portion of the message to the second processor or the second external device, based on the service or the application.

18. The electronic device of claim 9, wherein, when the message corresponds to a first service, the first processor is configured to control the second processor to transit a state of the second processor from a sleep state to an active state, in response to the first service having a predetermined priority level.

19. The electronic device of claim 18, wherein the first processor is configured to determine the priority level based on a user setting, a state of a user, a state of the electronic device, a property of the message, or an application generating or using the message.

20. A non-transitory computer-readable medium storing one or more processor executable instructions, which when executed by a first processor of an electronic device cause the first processor to perform a method comprising:
   receiving, by the first processor, a message transmitted by a first external device;
   identifying, by the first processor, a service or an application corresponding to the message based on information of the message; and
   determining, by the first processor, whether to allow a second processor of the electronic device to display a notification of the message or to provide at least a portion of the message to a second external device which is operatively coupled with the electronic device, according to the identified service or application corresponding to the message.

* * * * *